United States Patent
Bentz et al.

(10) Patent No.: US 10,047,967 B2
(45) Date of Patent: Aug. 14, 2018

(54) SYSTEMS AND METHODS FOR ADAPTIVE CONTROL OF STAGING FOR OUTDOOR MODULATING UNIT

(71) Applicant: Johnson Controls Technology Company, Holland, MI (US)

(72) Inventors: Jedidiah O. Bentz, Wichita, KS (US); Brian D. Rigg, Wichita, KS (US); Theresa N. Gillette, Wichita, KS (US); Tyler McCune, Wichita, KS (US); Shaun B. Atchison, Wichita, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 210 days.

(21) Appl. No.: 14/996,222

(22) Filed: Jan. 14, 2016

(65) Prior Publication Data
US 2017/0089603 A1 Mar. 30, 2017

Related U.S. Application Data

(60) Provisional application No. 62/235,539, filed on Sep. 30, 2015.

(51) Int. Cl.
*F24F 11/00* (2018.01)
*G05B 15/02* (2006.01)
(Continued)

(52) U.S. Cl.
CPC .......... *F24F 11/0012* (2013.01); *F24F 11/30* (2018.01); *F24F 11/62* (2018.01);
(Continued)

(58) Field of Classification Search
CPC .. F24F 11/0012; F24F 11/0086; F24F 11/006; F24F 2011/0091;
(Continued)

(56) References Cited

U.S. PATENT DOCUMENTS 6,522,954 B1 2/2003 Kummerer et al.
7,770,806 B2 8/2010 Herzon et al.
(Continued)

FOREIGN PATENT DOCUMENTS

WO WO-2013/149152 A1 10/2013

OTHER PUBLICATIONS

International Search Report and Written Opinion for PCT Application No. PCT/US2016/048241, dated Nov. 24, 2016, 11 pages.

*Primary Examiner* — Charles Kasenge
(74) *Attorney, Agent, or Firm* — Foley & Lardner LLP

(57) ABSTRACT

A thermostat includes a memory configured to store operating conditions for previously run conditioning events. The thermostat further includes a controller configured to receive first temperature data from a first temperature sensor indicative of a current indoor ambient temperature inside; receive second temperature data from a second temperature sensor indicative of a current outdoor ambient temperature outside; receive a temperature setpoint for a desired indoor ambient temperature of the building; determine a severity of a call for conditioning based on at least one of the current indoor ambient temperature, the current outdoor ambient temperature, and the temperature setpoint; and operate the multi-stage HVAC system in one of the plurality of stages for a current conditioning event based on the severity of the call for conditioning and the operating conditions for a similar previously run conditioning event to drive the current indoor ambient temperature towards the temperature setpoint.

17 Claims, 11 Drawing Sheets

(51) Int. Cl.
*G05B 11/01* (2006.01)
*G05B 19/042* (2006.01)
*G05D 23/19* (2006.01)
*F24F 11/30* (2018.01)
*F24F 11/62* (2018.01)
*F24F 110/10* (2018.01)
*F24F 110/12* (2018.01)
*F24F 140/50* (2018.01)
*F24F 140/60* (2018.01)
*F24F 11/64* (2018.01)
*F24F 11/66* (2018.01)
*F24F 11/56* (2018.01)
*F24F 11/61* (2018.01)
*F24F 11/46* (2018.01)
*F24F 11/52* (2018.01)

(52) U.S. Cl.
CPC .............. *G05B 11/01* (2013.01); *G05B 15/02* (2013.01); *G05B 19/0428* (2013.01); *G05D 23/1919* (2013.01); *G05D 23/1931* (2013.01); *F24F 11/46* (2018.01); *F24F 11/52* (2018.01); *F24F 11/56* (2018.01); *F24F 11/61* (2018.01); *F24F 11/64* (2018.01); *F24F 11/66* (2018.01); *F24F 2110/10* (2018.01); *F24F 2110/12* (2018.01); *F24F 2140/50* (2018.01); *F24F 2140/60* (2018.01); *G05B 2219/37375* (2013.01)

(58) Field of Classification Search
CPC ....... F24F 2011/0068; F24F 2011/0063; F24F 2011/0047; F24F 2011/0046; F24F 2011/00; G05B 11/01; G05B 15/02; G05B 19/0428; G05B 2219/37375
See application file for complete search history.

(56) References Cited

U.S. PATENT DOCUMENTS

| | | |
|---|---|---|
| 7,784,296 B2 | 8/2010 | Chen et al. |
| 7,839,275 B2 | 11/2010 | Spalink et al. |
| 7,966,104 B2 | 6/2011 | Srivastava et al. |
| 7,967,218 B2* | 6/2011 | Alles ............ F24F 3/044 165/212 |
| 8,011,199 B1 | 9/2011 | Chen et al. |
| 8,020,777 B2* | 9/2011 | Kates ............ F24D 19/1084 165/208 |
| 8,382,003 B2 | 2/2013 | Grohman |
| 8,650,894 B2 | 2/2014 | Tolbert, Jr. |
| 2006/0196953 A1* | 9/2006 | Simon ............ G05D 23/1934 236/46 R |
| 2010/0102135 A1* | 4/2010 | Alles ............ F24F 3/044 236/49.1 |
| 2012/0090337 A1 | 4/2012 | Chen et al. |
| 2012/0153725 A1* | 6/2012 | Grohman ............ H02J 3/14 307/39 |
| 2012/0259469 A1 | 10/2012 | Ward et al. |
| 2014/0067132 A1 | 3/2014 | Macek et al. |
| 2014/0180483 A1 | 6/2014 | Cheng et al. |
| 2014/0249876 A1 | 9/2014 | Wu et al. |
| 2014/0324244 A1 | 10/2014 | Musunuri et al. |
| 2014/0330438 A1 | 11/2014 | Haines et al. |
| 2015/0134123 A1 | 5/2015 | Obinelo |
| 2015/0316282 A1 | 11/2015 | Stone et al. |

* cited by examiner

SYSTEMS AND METHODS FOR ADAPTIVE CONTROL OF STAGING FOR OUTDOOR MODULATING UNIT

CROSS-REFERENCE TO RELATED PATENT APPLICATIONS

This application claims the benefit of U.S. Provisional Patent Application No. 62/235,539, titled "Systems and Methods for Adaptive Control of Staging for Outdoor Modulating Unit," filed Sep. 30, 2015, which is incorporated herein by reference in its entirety.

BACKGROUND

The present invention relates generally to heating, ventilating, and air conditioning (HVAC) and more particularly to the improved control of a building or residential HVAC system through adaptive control of staging for the HVAC system.

A thermostat is, in general, a component of an HVAC control system. Thermostats sense the temperature of a system and control components of the HVAC in order to maintain a desired setpoint. A thermostat can control a heating or cooling system or an air conditioner. Thermostats are manufactured in many ways, and use a variety of sensors to measure temperature and other desired parameters.

Conventional thermostats are configured for one-way communication to connected components, and control HVAC systems by turning on or off certain components or regulating flow. Each thermostat may include a temperature sensor and a user interface. The user interface typically includes a display for presenting information to a user and one or more user interface elements for receiving input from a user. To control the temperature of a building or home, a user adjusts the temperature setpoint via the thermostat's user interface.

SUMMARY

One exemplary embodiment relates to a thermostat communicably and operatively coupled to a heating, ventilating, and air conditioning (HVAC) system operable in a plurality of stages including an outdoor unit and an indoor unit. The thermostat includes a memory and a controller. The memory is configured to store operating conditions for previously run conditioning events of the multi-stage HVAC system. The controller is configured to receive first temperature data from a first temperature sensor indicative of a current indoor ambient temperature inside a building. The controller is further configured to receive second temperature data from a second temperature sensor indicative of a current outdoor ambient temperature outside of the building. The controller is further configured to receive a temperature setpoint for a desired indoor ambient temperature of the building. The controller is further configured to determine a severity of a call for conditioning for a current conditioning event based on at least one of the current indoor ambient temperature, the current outdoor ambient temperature, and the temperature setpoint. The controller is further configured to operate the multi-stage HVAC system in one of the plurality of stages for the current conditioning event based on the severity of the call for conditioning for the current conditioning event and the operating conditions for a similar previously run conditioning event to drive the current indoor ambient temperature towards the temperature setpoint.

Another exemplary embodiment relates to a method for controlling staging of a multi-stage heating, ventilating, and air conditioning (HVAC) system operable in a plurality of stages. The method includes storing, in a memory of a thermostat, operating conditions for previously run conditioning events of the multi-stage HVAC system; receiving, by the thermostat, first temperature data from a first temperature sensor indicative of a current indoor ambient temperature inside a building; receiving, by the thermostat, second temperature data from a second temperature sensor indicative of a current outdoor ambient temperature outside of the building; receiving, by a user interface of the thermostat, a temperature setpoint for a desired indoor ambient temperature of the building; determining, by the thermostat, a severity of a call for conditioning for a current conditioning event based on at least one of the current indoor ambient temperature, the current outdoor ambient temperature, and the temperature setpoint; and operating, by the thermostat, the multi-stage HVAC system in one of the plurality of stages for the current conditioning event based on the severity of the call for conditioning for the current conditioning event and the operating conditions for a similar previously run conditioning event to drive the current indoor ambient temperature towards the temperature setpoint.

Still another exemplary embodiment relates to a non-communicating thermostat communicably and operatively coupled to a multi-stage heating, ventilating, and air conditioning (HVAC) system operable in a plurality of stages. The non-communicating thermostat includes a memory, a first temperature sensor, a user interface, and a controller. The memory is configured to store operating conditions for previously run conditioning events of the multi-stage HVAC system. The first temperature sensor is configured to acquire indoor temperature data indicative of a current indoor ambient temperature. The user interface is configured to facilitate entering a temperature setpoint for a desired indoor ambient temperature. The controller is communicably coupled to a second temperature sensor configured to acquire outdoor temperature data indicative of a current outdoor ambient temperature. The second temperature sensor is positioned externally from the non-communicating thermostat. The controller is configured to receive the outdoor temperature data from the second temperature sensor. The controller is further configured to determine a severity of a call for conditioning for a current conditioning event based on at least one of the current indoor ambient temperature, the current outdoor ambient temperature, and the temperature setpoint. The controller is further configured to operate the multi-stage HVAC system in one of the plurality of stages for the current conditioning event based on the severity of the call for conditioning for the current conditioning event and the operating conditions for a similar previously run conditioning event to drive the current indoor ambient temperature towards the temperature setpoint.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for adaptive control of staging for an outdoor modulating unit based on conventional thermostat signals. The various concepts introduced above and discussed in greater detail below may be implemented in any of numerous ways, as the described concepts are not limited to any particular manner of implementation. Examples of specific implementations and applications are provided primarily for illustrative purposes. It should also be understood that the terminology is for the purpose of description only and should not be regarded as limiting.

According to an exemplary embodiment, the systems, apparatuses, and methods disclosed herein allow an outdoor modulating unit of an HVAC system of a building (e.g., a residential structure, etc.) coupled to a non-communicating thermostat or system to adapt to the building and thereby increase efficiency and performance of the outdoor modulating unit. Traditionally, anytime there are more than two-stages of compressor operation in a HVAC system, a communicating thermostat is used to control the HVAC system. In most cases, communicating thermostats are expensive and increase the system cost dramatically.

The thermostat of the present disclosure may include a non-communicating thermostat that is substantially cheaper than a communicating thermostat and is capable of controlling a multi-stage compressor of a HVAC system. As a brief overview, a control system of the non-communicating thermostat is configured to operate the outdoor modulating unit according to an algorithm based on the severity of conditioning required (e.g., heating, cooling, etc.) to reach a desired setpoint (e.g., a desired temperature, etc.) provided by a user or resident of the building. The severity of conditioning required may be based on at least one of conditions external to the building (e.g., weather, outdoor ambient temperature, humidity, etc.), conditions internal to the building (e.g., internal temperature, etc.), and the desired setpoint. The control system is further configured to recognize heating and/or cooling patterns in the building in which the outdoor modulating unit is installed to implement efficient operation methods that satisfy a user's demands (e.g., the desired setpoint, within a reasonable amount of time, etc.).

Figure 1:
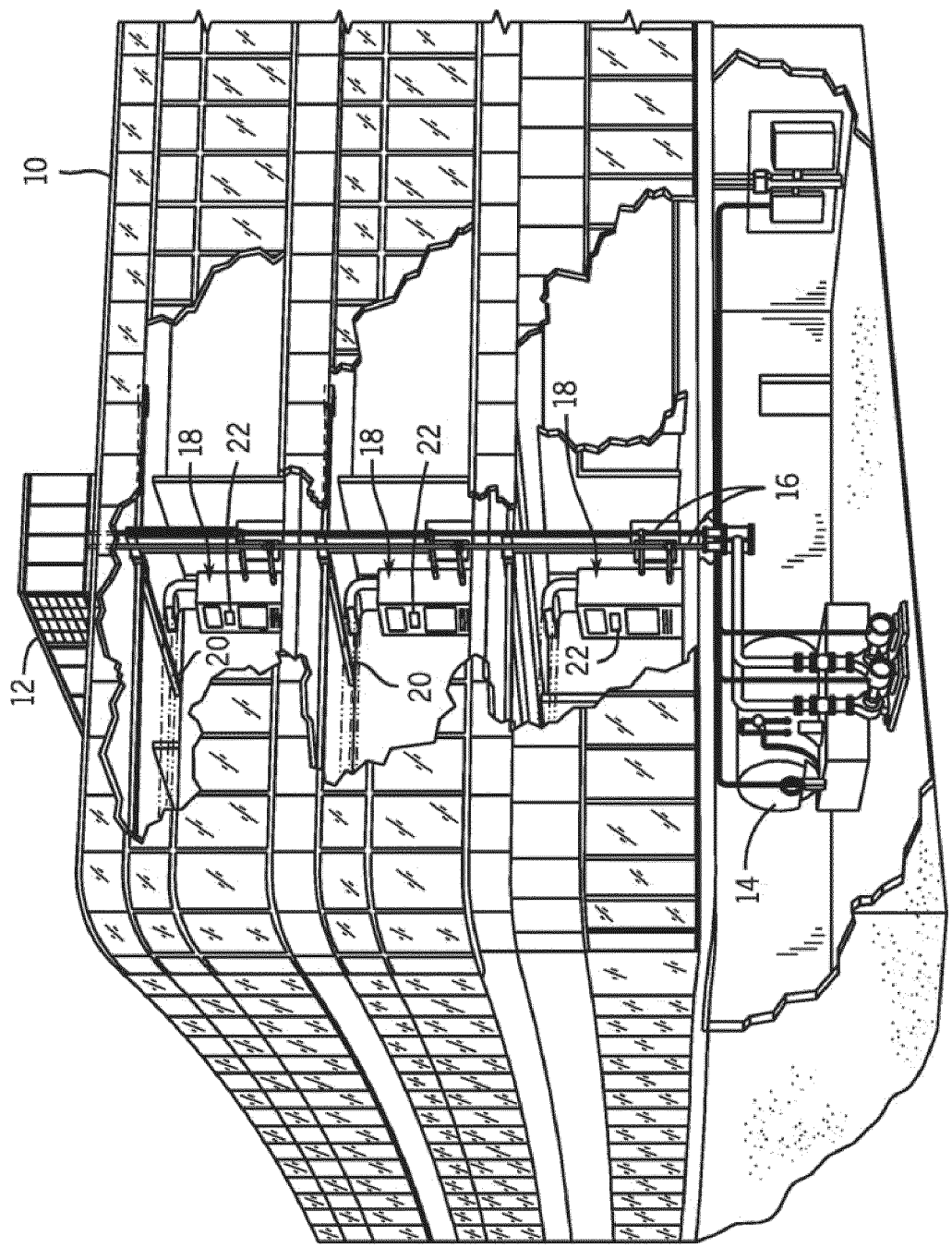
FIG. 1 is an illustration of a commercial or industrial HVAC system that employs heat exchangers, according to an exemplary embodiment.

FIG. 1 illustrates an exemplary application, in this case an HVAC system for building environmental management that may employ one or more control devices (e.g., thermostats, etc.) functioning as system controllers. A building 10 is cooled by a system that includes a chiller 12 and a boiler 14. As shown, the chiller 12 is disposed on the roof of the building 10 and the boiler 14 is located in the basement; however, the chiller 12 and the boiler 14 may be located in other equipment rooms or areas next to the building. The chiller 12 is an air cooled or water cooled device that implements a refrigeration cycle to cool water. The chiller 12 may be a stand-alone unit or may be part of a single package unit containing other equipment, such as a blower and/or integrated air handler. The boiler 14 is a closed vessel that includes a furnace to heat water. The water from the chiller 12 and the boiler 14 is circulated through the building 10 by water conduits 16. The water conduits 16 are routed to air handlers 18, located on individual floors and within sections of the building 10.

The air handlers 18 are coupled to ductwork 20 that is adapted to distribute air between the air handlers and may receive air from an outside intake (not shown). The air handlers 18 include heat exchangers that circulate cold water from the chiller 12 and hot water from the boiler 14 to provide heated or cooled air. Fans, within the air handlers 18, draw air through the heat exchangers and direct the conditioned air to environments within the building 10, such as rooms, apartments, or offices, to maintain the environments at a designated temperature. A control device 22, shown here as including a thermostat, may be used to designate the temperature of the conditioned air. The control device 22 also may be used to control the flow of air through and from the air handlers 18 and to diagnose mechanical or electrical problems with the air handlers 18. Other devices may, of course, be included in the system, such as control valves that regulate the flow of water and pressure and/or temperature transducers or switches that sense the temperatures and pressures of the water, the air, and so forth. Moreover, the control device may communicate with computer systems that are integrated with or separate from other building control or monitoring systems, and even systems that are remote from the building.

Figure 2:
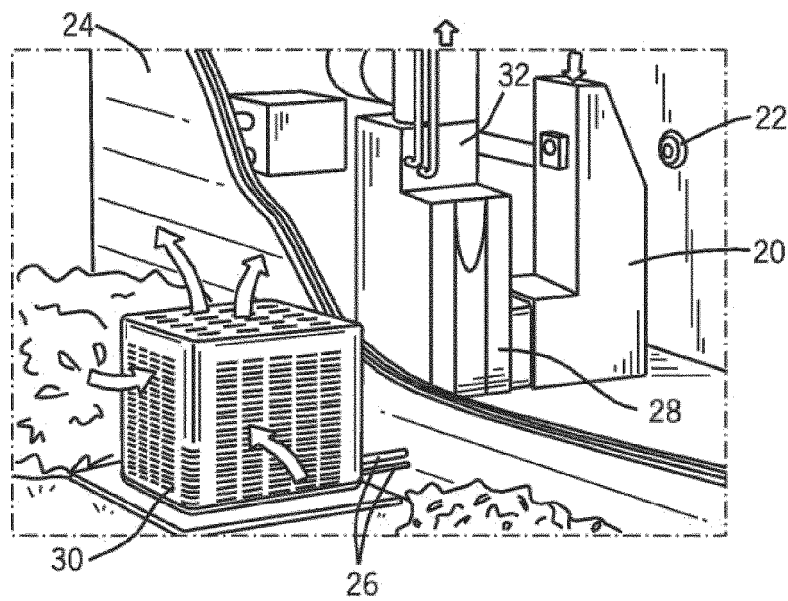
FIG. 2 is an illustration of a residential HVAC system that employs heat exchangers, according to an exemplary embodiment.

FIG. 2 illustrates a residential heating and cooling system. The residential heating and cooling system may provide heated and cooled air to a residential structure, as well as provide outside air for ventilation and provide improved indoor air quality (IAQ) through devices such as ultraviolet lights and air filters. In general, a residence 24 will include refrigerant conduits 26 that operatively couple an indoor unit 28 to an outdoor unit 30. According to an exemplary embodiment, the outdoor unit 30 is a multi-stage (e.g., two-stage, five-stage, ten-stage, etc.) modulating unit. For example, the HVAC system may include a multi-stage compressor (e.g., a five-speed compressor for both heating and cooling, totaling ten available speeds, etc.). The indoor unit 28 may be positioned in a utility room, an attic, a basement, and so forth. The outdoor unit 30 is typically situated adjacent to a side of the residence 24 and is covered by a shroud to protect the system components and to prevent leaves and other contaminants from entering the unit. The refrigerant conduits 26 transfer refrigerant between the indoor unit 28 and the outdoor unit 30, typically transferring primarily liquid refrigerant in one direction and primarily vaporized refrigerant in an opposite direction.

When the system shown in FIG. 2 is operating as an air conditioner, a coil in the outdoor unit 30 serves as a condenser for condensing vaporized refrigerant flowing from the indoor unit 28 to the outdoor unit 30 via at least one of the refrigerant conduits 26. In these applications, a coil of the indoor unit 28, designated by the reference numeral 32, serves as an evaporator/condenser coil. The indoor coil 32 receives liquid refrigerant (which may be expanded by an expansion device, not shown) and evaporates the refrigerant before returning it to the outdoor unit 30.

The outdoor unit 30 draws in environmental air through its sides as indicated by the arrows directed to the sides of the outdoor unit 30, forces the air through the coil of the outdoor unit 30 using a fan (not shown), and expels the air as indicated by the arrows above the outdoor unit 30. When operating as an air conditioner, the air is heated by the condenser coil within the outdoor unit 30 and exits the top of the outdoor unit 30 at a temperature higher than when the air entered the sides. Air is blown over the indoor coil 32 and is then circulated through the residence 24 by means of the ductwork 20, as indicated by the arrows entering and exiting the ductwork 20. The overall system operates to maintain a desired temperature as set by the control device 22. When the temperature sensed inside the residence 24 is higher than the setpoint on the thermostat (plus a small amount), the unit operates as an air conditioner and may become operative to refrigerate additional air for circulation through the residence 24. When the temperature reaches the setpoint (minus a small amount), the unit will stop the refrigeration cycle temporarily.

When the unit in FIG. 2 operates as a heat pump, the roles of the coils are simply reversed. That is, the coil of the outdoor unit 30 will serve as an evaporator to evaporate refrigerant and thereby cool air entering the outdoor unit 30 as the air passes over the coil of the outdoor unit 30. The indoor coil 32 will receive a stream of air blown over it and will heat the air by condensing a refrigerant.

Figure 3:
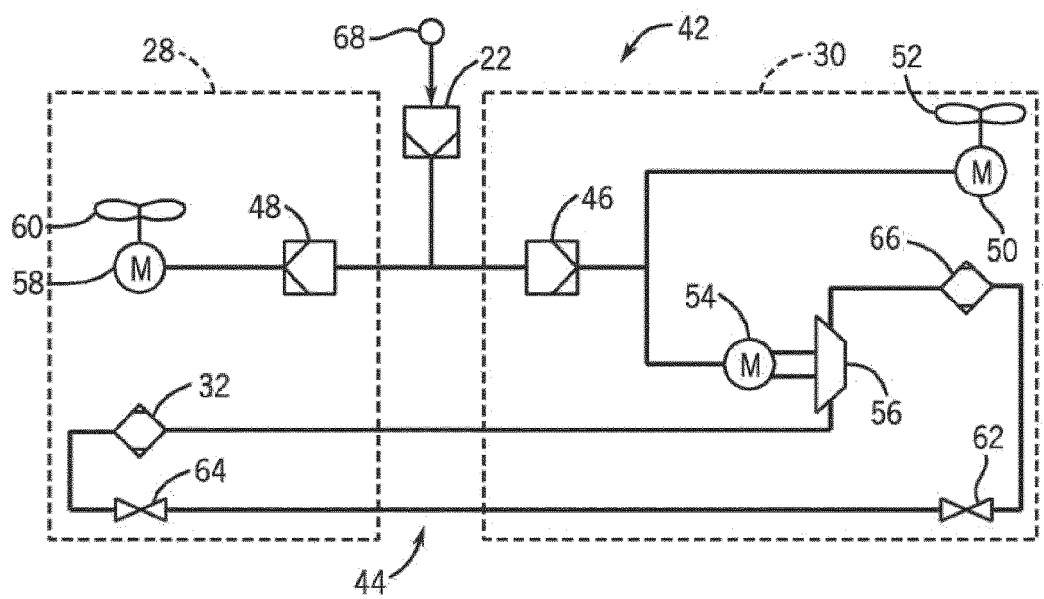
FIG. 3 is a block diagram of a HVAC system that employs a control device such as a thermostat, according to an exemplary embodiment.

FIG. 3 is a block diagram of an HVAC system 42 that includes the control device 22, the indoor unit 28 functioning as an air handler, and the outdoor unit 30 functioning as a heat pump. Refrigerant flows through the HVAC system 42 within a closed refrigeration loop 44 between the outdoor unit 30 and the indoor unit 28. The refrigerant may be any fluid that absorbs and extracts heat. For example, the refrigerant may be hydrofluorocarbon (HFC) based R-410A, R-407C, or R-134a.

The operation of the indoor unit 28 is controlled by a first control circuit, shown as indoor control circuit 48, and the outdoor unit 30 is controlled by a second control circuit, shown as outdoor control circuit 46, respectively. The outdoor control circuit 46 and/or the indoor control circuit 48 may execute hardware or software control algorithms to regulate the HVAC system 42. According to exemplary embodiments, the outdoor control circuit 46 and/or the indoor control circuit 48 may include one or more microprocessors, analog to digital converters, non-volatile memories, and interface boards. In certain embodiments, the outdoor control circuit 46 and/or the indoor control circuit 48 may be fitted with or coupled to auxiliary control boards that allow conventional 24 VAC wiring to be controlled through serial communications.

The outdoor control circuit 46 and/or the indoor control circuit 48 may receive control signals from the control device 22 and transmit the signals to equipment located within the outdoor unit 30 and the indoor unit 28, respectively. For example, the outdoor control circuit 46 may route control signals to a motor 50 that powers a fan 52 and/or to a motor 54 that powers a compressor 56. The indoor control circuit 48 may route control signals to a motor 58 that powers a fan 60. The outdoor control circuit 46 and the indoor control circuit 48 may also transmit control signals to other types of equipment such as metering device 62, metering device 64, sensors, and switches, respectively.

According to exemplary embodiments, the control device 22 may communicate with the outdoor control circuit 46 and/or the indoor control circuit 48 by transmitting communication packets over a serial communication interface. The control device 22 may function as the master system controller, while the outdoor control circuit 46 and/or the indoor control circuit 48 may operate as slave devices. In certain embodiments, the control device 22 may send a ping message to discover connected slave devices and their properties. For example, the outdoor control circuit 46 and/or the indoor control circuit 48 may transmit an acknowledgement message in response to receiving a ping message from the control device 22. The outdoor control circuit 46 and/or the indoor control circuit 48 may also transmit information, in response to requests from the control device 22, identifying the type of unit and specific properties of the unit. For example, the outdoor control circuit 46 may transmit a signal to the control device 22 indicating that it controls a multi-stage outdoor unit 30 (e.g., two-stage, five-stage, ten-stage, etc.). The outdoor control circuit 46 and/or the indoor control circuit 48 may also transmit signals identifying terminal connections and jumper settings of the control circuits.

The control device 22 may operate to control the overall heating and cooling provided by the indoor unit 28 and the outdoor unit 30 of the HVAC system 42. The indoor unit 28 and the outdoor unit 30 include an indoor coil 32 and an outdoor coil 66, respectively, that both operate as heat exchangers. The outdoor coil 66 and/or the indoor coil 32 may function either as an evaporator or a condenser depending on the operation mode of the HVAC system 42 (e.g., a heating mode, a cooling mode, etc.). For example, when HVAC system 42 is operating in a cooling (or "AC") mode, the outdoor coil 66 may function as a condenser, releasing heat to the outside air, while the indoor coil 32 may function as an evaporator, absorbing heat from the inside air. When HVAC system 42 is operating in a heating mode, the outdoor coil 66 may function as an evaporator, absorbing heat from the outside air, while the indoor coil 32 may function as a condenser, releasing heat to the inside air. A reversing valve may be positioned on the closed refrigeration loop 44 to control the direction of refrigerant flow and thereby to switch the HVAC system 42 between the heating mode and the cooling mode.

The HVAC system 42 may also include two metering devices 62 and 64 for decreasing the pressure and temperature of the refrigerant before it enters the evaporator. The metering devices 62 and 64 also regulate the refrigerant flow entering the evaporator so that the amount of refrigerant entering the evaporator equals, or approximately equals, the amount of refrigerant exiting the evaporator. The metering device used depends on the operation mode of the HVAC system 42. For example, when the HVAC system 42 is operating in the cooling mode, refrigerant bypasses the metering device 62 and flows through the metering device 64 before entering the indoor coil 32, which acts as an evaporator. In another example, when the HVAC system 42 is operating in the heating mode, refrigerant bypasses the metering device 64 and flows through the metering device 62 before entering the outdoor coil 66, which acts as an evaporator. According to other exemplary embodiments, a single metering device may be used for both the heating mode and the cooling mode. The metering devices 62 and 64 are typically thermal or electronic expansion valves, but may also be orifices or capillary tubes.

The refrigerant enters the evaporator, which is the outdoor coil 66 in the heating mode and the indoor coil 32 in the cooling mode, as a low temperature and pressure liquid. Some vapor refrigerant may also be present as a result of the expansion process that occurs in the metering device 62 or 64. The refrigerant flows through tubes in the evaporator and absorbs heat from the air changing the refrigerant into a vapor. In cooling mode, the indoor air flowing across the multichannel tubes also may be dehumidified. The moisture from the air may condense on the outer surface of the multichannel tubes and consequently be removed from the air.

After exiting the evaporator, the refrigerant flows into the compressor 56. The compressor 56 decreases the volume of the refrigerant vapor, thereby, increasing the temperature and pressure of the vapor. The compressor 56 may be any suitable compressor such as a screw compressor, reciprocating compressor, rotary compressor, swing link compressor, scroll compressor, or turbine compressor.

From the compressor 56, the increased temperature and pressure vapor refrigerant flows into a condenser, the location of which is determined by the mode of operation of the HVAC system 42. In the cooling mode, the refrigerant flows into the outdoor coil 66 (acting as a condenser). The fan 52, which is powered by the motor 50, draws air across the tubes containing refrigerant vapor. According to certain exemplary embodiments, the fan 52 may be replaced by a pump that draws fluid across the multichannel tubes. The heat from the refrigerant is transferred to the outside air causing the refrigerant to condense into a liquid. In the heating mode, the refrigerant flows into the indoor coil 32 (acting as a condenser). The fan 60, which is powered by the motor 58, draws air across the tubes containing refrigerant vapor. The heat from the refrigerant is transferred to the inside air causing the refrigerant to condense into a liquid and the inside air to increase in temperature.

After exiting the condenser, the refrigerant flows through the metering device (e.g., the metering device 62 in the heating mode, the metering device 64 in the cooling mode, etc.) and returns to the evaporator (e.g., the outdoor coil 66 in the heating mode, the indoor coil 32 in the cooling mode, etc.) where the process begins again.

In both the heating mode and the cooling mode, the motor 54 drives the compressor 56 and circulates refrigerant through the closed refrigeration loop 44. The motor 54 may receive power either directly from an AC or DC power source or from a variable speed drive (VSD). The motor 54 may be a switched reluctance (SR) motor, an induction motor, an electronically commutated permanent magnet motor (ECM), or any other suitable motor type.

The operation of the motor 54 may be controlled by the outdoor control circuit 46. The outdoor control circuit 46 may receive control signals from the control device 22. In certain embodiments, the control device 22 may receive information from a sensor 68 (e.g., an interior temperature sensor, an outdoor temperature sensor, etc.) that measures at least one of an indoor ambient air temperature of the residence 24 and an outdoor ambient air temperature of the air outside of the residence 24. The control device 22 may then compare the indoor ambient air temperature to the temperature setpoint (which may be input by a user) and engages at least one of the motor 54, the motor 50, and the motor 58 to run the HVAC system 42 in the cooling mode if the air temperature is above the temperature setpoint. In the heating mode, the control device 22 may compare the indoor ambient air temperature from the sensor 68 to the temperature setpoint and engages the motors 50, 54, and 58 to run the HVAC system 42 if the air temperature is below the temperature setpoint. According to an exemplary embodiment, the control device 22 operates the outdoor unit 30 in one of a plurality of stages of the outdoor unit 30 based on at least one of the indoor ambient air temperature of the residence 24, the outdoor ambient air temperature of the air outside of the residence 24, and the temperature setpoint.

The outdoor control circuit 46 and the control device 22 may also initiate a defrost cycle when the HVAC system 42 is operating in the heating mode. When the outdoor temperature approaches freezing, moisture in the outside air that is directed over the outdoor coil 66 may condense and freeze on the outdoor coil 66. Sensors may be included within the outdoor unit 30 to measure the outside air temperature and the temperature of the outdoor coil 66. These sensors provide the temperature information to the outdoor control circuit 46 which determines when to initiate a defrost cycle.

Figure 4:
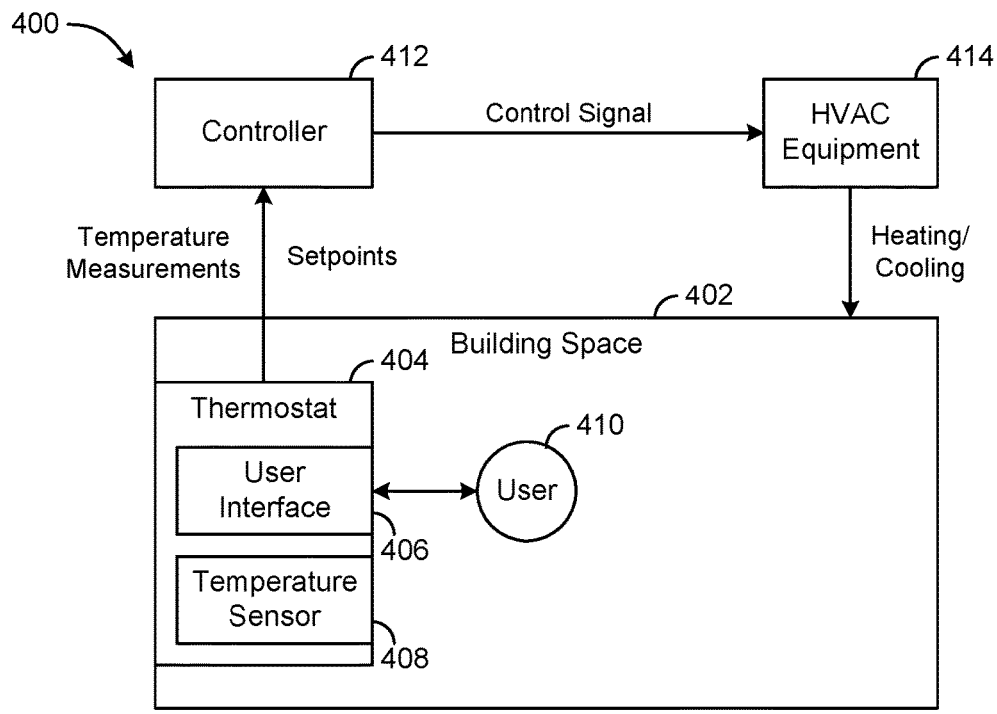
FIG. 4 is a block diagram of a system for controlling the temperature of a building space using a wall-mounted thermostat, according to an exemplary embodiment.

Referring now to FIG. 4, a system 400 for monitoring and controlling the temperature of a building space is shown, according to an exemplary embodiment. The system 400 is shown to include a thermostat 404 installed within a building space 402. Typically, the thermostat 404 is mounted on a wall within the building space 402. The thermostat 404 is shown to include user interface 406 and a temperature sensor 408. User interface 406 may include an electronic display for presenting information to a user 410 and one or more physical input devices (e.g., a rotary knob, pushbuttons, manually-operable switches, etc.) for receiving input from the user 410. The temperature sensor 408 is configured to measure the temperature of building space 402 (i.e., the indoor ambient temperature) and provide the measured temperature to user interface 406.

The thermostat 404 communicates with a controller 412. In various embodiments, the controller 412 may be integrated with the thermostat 404 or may exist as a separate controller (e.g., a field and equipment controller, a supervisory controller, etc.) that receives input from the thermostat 404. The thermostat 404 may send temperature measurements and user-defined temperature setpoints to the controller 412. The controller 412 uses the temperature measurements and the setpoints to generate a control signal for HVAC equipment 414. The control signal causes the HVAC equipment 414 to provide heating and/or cooling to the building space 402.

Figure 5:
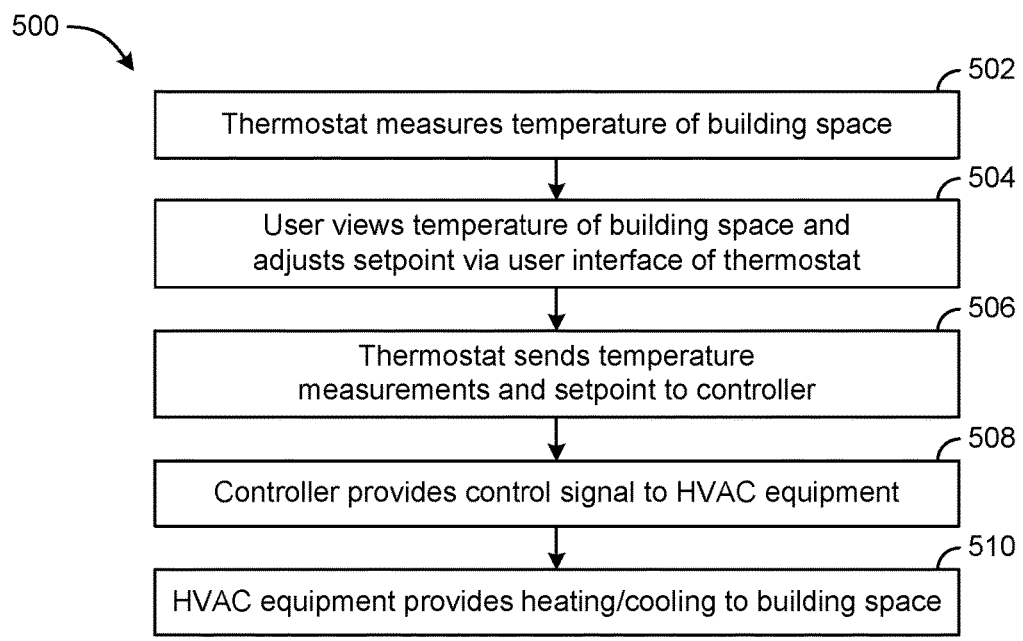
FIG. 5 is a flowchart of a process for controlling the temperature of a building space using a wall-mounted thermostat, according to an exemplary embodiment.

Referring now to FIG. 5, a process 500 for monitoring and controlling the temperature of a building space is shown, according to an exemplary embodiment. Process 500 may be performed by the system 400, as described with reference to FIG. 4. In process 500, the thermostat 404 measures the temperature of the building space 402 (step 502). The user 410 views the measured temperature and adjusts the temperature setpoint via the user interface 406 of the thermostat 404 (step 504). The thermostat 404 sends the measured temperature and the setpoint to the controller 412 (step 506). The controller 412 uses the measured temperature and the setpoint to generate and provide a control signal to the HVAC equipment 414 (step 508). The HVAC equipment 414 operates in accordance with the control signal to provide heating/cooling to the building space 402 (step 510).

Figure 6:
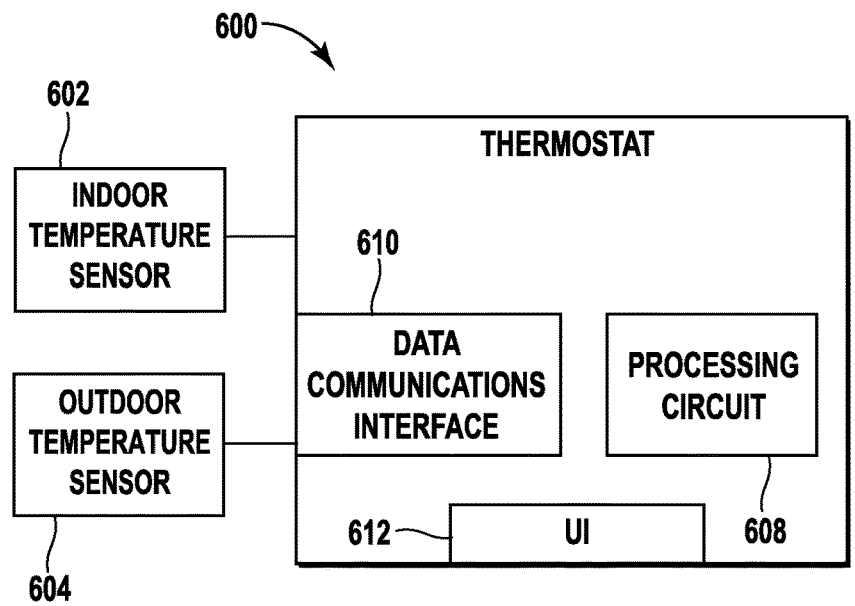
FIG. 6 is a block diagram of a thermostat with which a user may control the temperature of a building space or HVAC system of FIGS. 1, 2, and/or 3, according to an exemplary embodiment.

In FIG. 6, a block diagram of a thermostat 600 is shown including a processing circuit 608, a data communications interface 610, and a user interface 612. The thermostat 600 may be or included within the control device 22 of FIGS. 1, 2, and/or 3. The thermostat 600 may be capable of bi-directional communication with equipment (e.g., the HVAC system 42, the outdoor unit 30, the indoor unit 28, etc.) through data communications interface 610. According to an exemplary embodiment, the thermostat 600 is configured as a non-communicating thermostat (e.g., does not communicate with external systems or components outside of the HVAC system 42, etc.). In some embodiments, the non-communicating thermostat includes a conventionally wired two-stage non-communicating thermostat. In alternative embodiments, the thermostat 600 is configured as a communicating thermostat (e.g., may communicate with external systems or components outside of the HVAC system 42 such as a smartphone or tablet, etc.). The user interface 612 enables a user to communicate with the thermostat 600. The user interface 612 may include, but is not limited, an interactive display, a touchscreen device, one or more buttons and switches, voice command receivers, etc. In some embodiments, the user interface 612 may be structured as solely an output device, where the signals, values, messages, information, etc. (e.g., such as the current indoor ambient temperature, the current outdoor ambient temperature, a temperature setpoint, etc.) may only be provided to a user of the thermostat 600. In other embodiments, the user interface 612 may be structured as solely an input device, where a user may provide information, signals, messages, etc. to the thermostat 600 to select a temperature setpoint, set an operating schedule (e.g., on/off schedule, various temperature setpoints based on the time of day, weekday, or weekend, etc.). In further embodiments, the user interface 612 may be structured as a combination thereof (e.g., a touchscreen, etc.).

The thermostat 600 may be communicably coupled to at least one of a first temperature sensor, shown as indoor temperature sensor 602, and a second temperature sensor, shown as outdoor temperature sensor 604. In some embodiments, the indoor temperature sensor 602 is disposed within a housing of the thermostat 600. In other embodiments, the indoor temperature sensor 602 is remotely located from the thermostat 600 (e.g., in a different room or location of the residence 24, etc.). In some embodiments, the thermostat 600 is communicably coupled to a plurality of indoor temperature sensors 602 positioned variously throughout a building. The outdoor temperature sensor 604 may be positioned outside of a building (e.g., the residence 24, etc.) in which the thermostat 600 is installed within. In one embodiment, the indoor temperature sensor 602 and/or the outdoor temperature sensor 604 are communicably coupled to the data communications interface 610 via a wired communications protocol. In an alternative embodiment, the indoor temperature sensor 602 and/or the outdoor temperature sensor 604 are communicably coupled to the data communications interface 610 via a wireless communications protocol.

According to an exemplary embodiment, the indoor temperature sensor 602 is configured to measure/acquire indoor temperature data indicative of an indoor ambient temperature of a building (e.g., the residence 24, etc.). According to an exemplary embodiment, the outdoor temperature sensor 604 is configured to measure/acquire outdoor temperature data indicative of an outdoor ambient temperature of an environment outside a building (e.g., the residence 24, etc.). In some embodiments, the thermostat 600 may be communicably coupled to other sensors such as motion sensors, cameras, microphones, capacitive sensors, wind sensors, humidity sensors, pressure sensors, and/or any number of other sensors.

Figure 7:
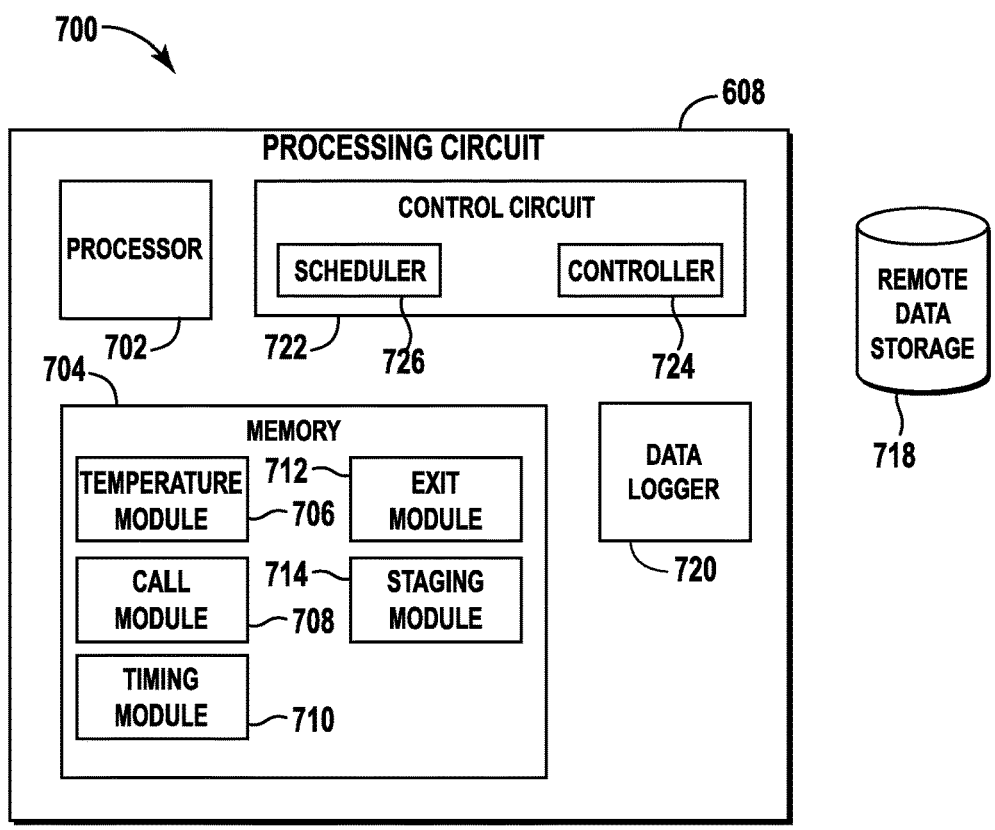
FIG. 7 is a system block diagram of a processing circuit of the thermostat of FIG. 6, according to an exemplary embodiment.

Now referring to FIG. 7, the processing circuit 608 is shown to include a processor 702 and a memory 704. The processor 702 may be a general purpose or specific purpose processor, an application specific integrated circuit (ASIC), one or more field programmable gate arrays (FPGAs), a group of processing components, or other suitable processing components. The processor 702 is configured to execute computer code or instructions stored in the memory 704 or received from other computer readable media (e.g., CDROM, network storage, a remote server, etc.).

The memory 704 may include one or more devices (e.g., memory units, memory devices, storage devices, etc.) for storing data and/or computer code for completing and/or facilitating the various processes described in the present disclosure. The memory 704 may include random access memory (RAM), read-only memory (ROM), hard drive storage, temporary storage, non-volatile memory, flash memory, optical memory, or any other suitable memory for storing software objects and/or computer instructions. The memory 704 may include database components, object code components, script components, or any other type of information structure for supporting the various activities and information structures described in the present disclosure. The memory 704 may be communicably connected to the processor 702 via processing circuit 608 and may include computer code for executing (e.g., by the processor 702, etc.) one or more processes described herein. When the processor 702 executes instructions stored in the memory 704 for completing the various activities described herein, the processor 702 generally configures the thermostat 600 (and more particularly processing circuit 608) to complete such activities.

Processing circuit 608 is shown to include a control circuit 722 which includes a controller 724 and a scheduler 726. Controller 724 may be an embodiment of the control device 22, and is able to communicate with and send commands to connected equipment (e.g., the HVAC system 42, the outdoor unit 30, the indoor unit 28, etc.). The scheduler 726 is a module which is configured to receive calendar and schedule data to organize and send commands to connected equipment. For example, a user of the thermostat 600 may program the heating and/or cooling of his/her residence based on a schedule (e.g., time of day, season of the year, day of the week, etc.).

Processing circuit 608 is also shown to include a data logger 720. In some embodiments, the system 700 includes remote data storage 718. The data logger 720 may record data in memory 704. In some embodiments, the processing circuit 608 may store data additionally or alternatively in remote data storage 718. While storing data locally may reduce access time, the cost of providing suitable storage space may discourage user adoption. The remote data storage 718 is remote from processing circuit 608 and may be accessed through any number of communications protocols (e.g., wired, wireless, etc.). For example, remote storage device 718 may be an external memory device (e.g., flash drive, memory chip, external hard drive, etc.) or a cloud based storage device.

As a brief overview, the processing circuit 608, along with the memory 704, may be configured to monitor various operating conditions of an HVAC system during cooling and/or heating operations to adapt to the settings and conditions of the respective residence within which the thermostat 600 is installed to meet setpoint requirements provided by a user. The processing circuit 608 is configured to create relationships between system demands (e.g., "Y" calls, etc.) and performance outcomes of the HVAC system. The operating conditions and relationships are recorded by the processing circuit 608 and may be recalled at a later time and/or date under similar conditions to influence more efficient subsequent operation of the HVAC system. Thus, the thermostat 600 is configured to be adaptive to the environment in which the HVAC system of the residence is operating, aiming for increased efficiency in a non-communicating (or communicating) system.

The processing circuit 608 may be further configured to control a post-run ability of the HVAC system, where the HVAC system stages down after a temperature setpoint is satisfied. This may provide the ability to try and continue conditioning the residence for a period time while the HVAC system is running at the same or lower stage, for better heating or cooling based on energy expended. This may effectively increase a time gap between on cycles of the HVAC system, while also reducing energy consumption due to lower staging, which may prove to be beneficial.

The memory 704 is shown to include a temperature module 706, a call module 708, a timing module 710, an exit module 712, and a staging module 714 for completing the processes described herein. The temperature module 706 may be configured to receive and interpret temperature data from at least one of the indoor temperature sensor 602 indicative of the indoor ambient temperature and the outdoor temperature sensor 604 indicative of the outdoor ambient temperature. As such, the temperature module 706 may include communication circuitry (e.g., relays, wiring, network interfaces, circuits, etc.) that facilitate the exchange of information, data, values, non-transient signals, etc. between and among the temperature module 706, the indoor temperature sensor 602, and/or the outdoor temperature sensor 604.

The call module 708 may be configured to determine the severity of conditioning required of a HVAC system to reach a desired temperature setpoint inside a residence. The call module 708 may be configured to receive a call for conditioning (e.g., heating, cooling, etc.) via a user input (e.g., a user of the thermostat 600 turning on the HVAC system with a requested temperature setpoint, etc.), from the scheduler 726 (e.g., according to a preset schedule, etc.), and/or in response to the indoor ambient temperature deviating from a setpoint by a threshold amount. As such, the call module 708 may include communication circuitry (e.g., relays, wiring, network interfaces, circuits, etc.) that facilitate the exchange of information, data, values, non-transient signals, etc. between and among the call module 708, the temperature module 706, the scheduler 726, and/or the user interface 612. The call module 708 may be configured to determine that severity of the call for conditioning is relatively low, referred to as a Y1 call herein, or relatively high, referred to as a Y2 call herein. The severity of conditioning required (e.g., a Y1 call versus a Y2 call, etc.) may be based on at least one of the desired temperature setpoint, the current indoor ambient temperature, and the current outdoor ambient temperature. A Y1 call may mean that the indoor ambient temperature is relatively closer to the desired temperature setpoint than a Y2 call. For example, if the difference between the current indoor ambient temperature and the desired temperature setpoint is less than a threshold value (e.g., 2 degrees, 3 degrees, etc.), a Y1 call is activated. However, if the difference between the current indoor ambient temperature and the desired temperature setpoint is greater than the threshold value, a Y2 call is activated. In some embodiments, the outdoor ambient temperature is also taken into account when determining the severity of conditioning required. For example, the difference between the current indoor ambient temperature and the desired temperature setpoint may be less than the threshold value, but the desired temperature setpoint may differ from the current outdoor ambient temperature greater than a second threshold value (e.g., twenty degrees, fifty degrees, etc.) such that it may take more conditioning and energy to overcome the temperature differential between the current indoor ambient temperature and the current outdoor ambient temperature to reach the desired setpoint. Thus, a Y2 call may be activated in situations where the current indoor ambient temperature and the desired temperature setpoint are relatively close (e.g., less than the first threshold value, etc.).

The timing module 710 may be configured monitor at least one of stage run time, current/previous run time, and off time of the HVAC system (e.g., the outdoor unit 30, etc.). The stage run time may represent the duration of time the HVAC system ran or is currently running during a respective stage of the HVAC system (e.g., thirty-five minutes at stage four, five minutes at stage three, etc.). In some embodiments, a stage run time threshold is implemented such that the HVAC system exits a current stage after a duration of time specified by the stage run time threshold (e.g., ten minutes, thirty minutes, forty, sixty minutes, etc.). The stage run time threshold may be present or based on a previous conditioning event. The current/previous run time may represent the current or previous duration of time in which the HVAC system is/was conditioning (i.e., active, on) in one or more stages (e.g., forty minutes total in stages four and three, etc.). In some embodiments, a current run time threshold is implemented such that the HVAC system turns off after a duration of time specified by the current run time threshold (e.g., ninety minutes, even if the desired temperature setpoint is not reached, based on the time it took to reach the desired setpoint in a previous similar conditioning event, etc.). The current run time threshold may be present or based on a previous conditioning event. The off time may represent the duration of time the HVAC system is not conditioning (i.e., off, time between conditioning events). In some embodiments, an off time threshold is implemented such that the HVAC system remains off for at least a duration of time specified by the off time threshold (e.g., five minutes, etc.) between conditioning events.

The exit module 712 may be configured to record the stage of the HVAC system at the end of a conditioning event (e.g., an exit stage, etc.). The exit module 712 may be further configured to determine the effectiveness of the conditioning event in response to the HVAC system being turned off. As used herein, an effectiveness value of one may represent a relatively effective conditioning event (or a relatively faster call satisfaction), and an effectiveness value of two may represent a relatively ineffective conditioning event (or a relatively slower call satisfaction). In one embodiment, the exit module 712 is configured to determine that the conditioning event was relatively effective based on the stage run time being less than the stage run time threshold. In some embodiments, the exit module 712 is configured to determine that the conditioning event was relatively ineffective based on the stage run time exceeding the stage run time threshold. In some embodiments, the exit module 712 is configured to determine that the conditioning event was relatively effective based on the current run time being less than the current run time threshold. On the other hand, the exit module 712 is configured to determine that the conditioning event was relatively ineffective based on the current run time exceeding the current run time threshold. In some embodiments, the exit module 712 is configured to determine that the conditioning event was relatively effective based on the current run time being less than the previous run time for the same or substantially the same operating conditions (e.g., temperature setpoint, initial indoor ambient temperature, initial outdoor ambient temperature, etc.). While the exit module 712 may determine that the conditioning event was relatively ineffective compared to a previous conditioning event based on the current run time exceeding the previous run time.

The staging module 714 may be configured to adaptively control the stage of operation of the HVAC system based on at least one of the severity of the conditioning required (e.g., a Y1 call, a Y2 call, etc.), the current indoor ambient temperature, the current outdoor ambient temperature, the desired temperature setpoint, and previous conditioning events that were similar (e.g., similar temperatures, temperature differentials, temperature setpoints, etc.). According to an exemplary embodiment, the staging module 714 controls the stage of operation of the HVAC system differently based on whether the current conditioning event is the first conditioning event (i.e., the HVAC system and/or thermostat 600 was just installed) and/or the current conditions have never been experienced before (e.g., an outdoor ambient temperature that the HVAC system has never encountered, etc.) compared to subsequent operations.

At first operation (e.g., of a new HVAC system, a newly installed thermostat 600, at new conditions, etc.), the staging module 714 is configured to operate the HVAC system at a predetermined stage (e.g., stage four of a five stage HVAC system, etc.). In some embodiments, the predetermined stage is set near the maximum capability of the HVAC system (e.g., 80% of maximum, one stage lower than the maximum stage, etc.). The staging module 714 may determine that the building (e.g., the residence 24, etc.) is out of condition by a relatively large degree at first operation because that there may not have been any conditioning provided to the interior of the building during the install of the HVAC system and/or the thermostat 600. Thus, setting the predetermined stage near the maximum capability of the HVAC system may allow the HVAC system to reach desired conditions (e.g., a temperature setpoint, etc.) within a suitable period of time.

During subsequent operations (e.g., where previous conditioning events experienced similar conditions, etc.), the staging module 714 is configured to recall at least one of the severity of the conditioning event required (e.g., a Y1 call, a Y2 call, determined by the call module 708, etc.), the effectiveness value of the previous conditioning event with similar conditions (e.g., an effectiveness value of one, an effectiveness value of two, determined by the exit module 712, etc.), and the exit stage of the previous conditioning event with similar conditions (e.g., determined by the exit module 712, etc.) to determine a new operation sequence for the HVAC system (e.g., adapting based on previously run similar conditioning events, etc.). The staging module 714 is then configured to operate the HVAC at a stage based on the at least one of the severity of the conditioning event required, the effectiveness value of the previous conditioning event with similar conditions, and the exit stage of the previous conditioning event with similar conditions.

In one embodiment, the staging module 714 is configured to increase the operating stage of the HVAC system in response to the stage run time exceeding the stage run time threshold during a conditioning event. In some embodiments, the staging module 714 is configured to keep the stage the same during an conditioning event in response to the stage run time exceeding the stage run time threshold (e.g., if the HVAC system is already operating at the maximum stage, etc.). In some embodiment, the staging module 714 is configured to turn off the HVAC system in response to the current run time exceeding the current run time threshold during a conditioning event or the current run time exceeding a previous run time. In some embodiments, the staging module 714 is configured to decrease the stage of the HVAC system to a predetermined stage (e.g., stage four from stage five, etc.) in response to the outdoor ambient temperature exceeding a first temperature threshold (e.g., 110 degrees Fahrenheit, a high ambient temperature threshold, etc.) or falling below a second temperature threshold (e.g., −10 degrees Fahrenheit, a low ambient temperature threshold, etc.). For example, the staging module 714 may only operate the HVAC in a maximum stage (e.g., stage five, etc.) when the outdoor ambient temperature is within a predefined temperature range (e.g., between the first, high temperature threshold and the second, low temperature threshold, etc.).

The staging module 714 may be configured to recall similar operating instances based on outdoor ambient temperature and begin operating the HVAC system at that level. In some embodiments, the staging module 714 is configured to implement experimental energy savings methods in an effort to monitor the efficiency of keeping an HVAC system turned off longer by running at a lower stage for a post-run sequence (e.g., for five minutes, etc.) following a conditioning event (e.g., meeting the desired temperature setpoint, etc.). This experimental operation may be compared to non-experimental operation in which the HVAC system does not perform a post-run sequence. The operation of the thermostat 600 and the various modules thereof is more fully described below with reference to FIGS. 10-13B.

Figure 8:
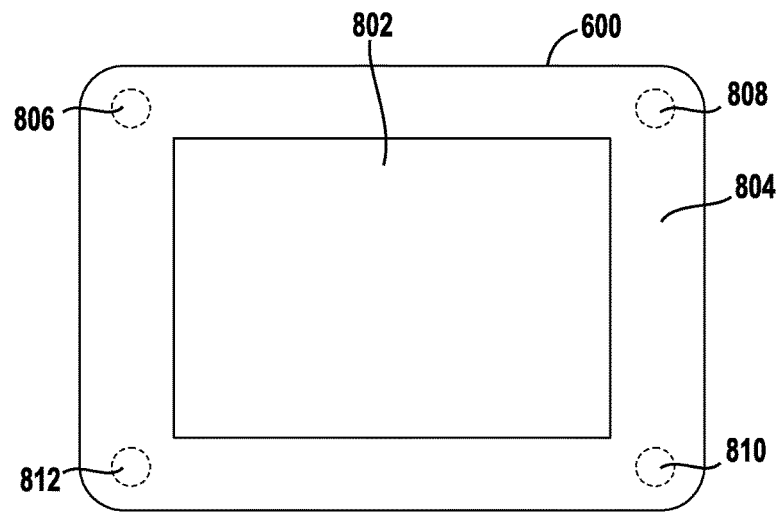
FIG. 8 is a drawing of a thermostat and its user interface elements, according to an exemplary embodiment.

Referring now to FIG. 8, the thermostat 600 is shown to have a display 802 and a frame 804. In some embodiments, the display 802 is touch-sensitive, and may be a capacitive LCD screen. In some embodiments, the frame 804 is touch-sensitive. In some embodiments, a capacitive layer may extend from the display 802 out over the frame 804. The thermostat 600 may be configured to have buttons 806-812 on the frame 804. The buttons 806-812 on the frame 804 may be touch sensitive buttons or physical buttons. The buttons 806-812 may be used by a user of the thermostat 600 to select a temperature setpoint, set an operating schedule, and/or otherwise command and/or program the thermostat 600. In alternative embodiment, at least one of the display 802, the frame 804, and the buttons 806-812 include resistive touch elements and/or other touch-sensitive elements.

Figure 9:
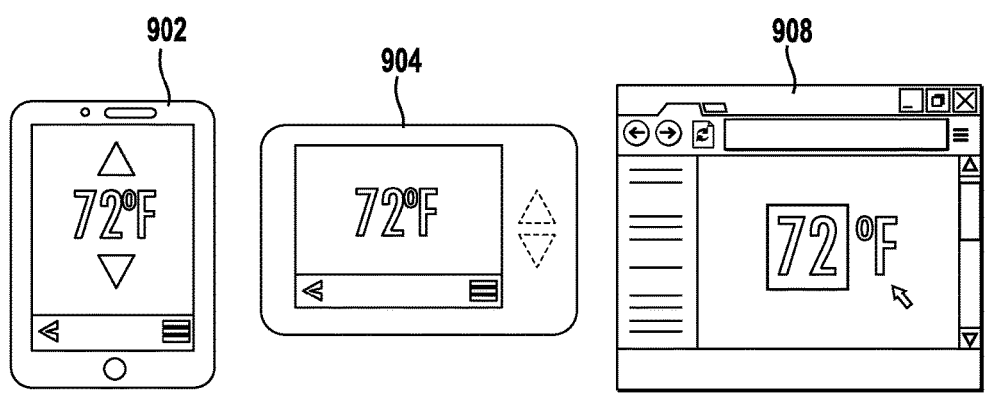
FIG. 9 is a drawing of the various user interfaces through which a user may control a thermostat, according to an exemplary embodiment.

Referring now to FIG. 9, exemplary user interfaces 902, 904, and 908 are shown. The user interfaces 902-908 are used to interact with and control thermostat 600. The user interface 904 is an exemplary embodiment of the user interface 612, and is physically integrated with the thermostat 600 (e.g., a non-communicating thermostat, etc.). In an alternative embodiment, the thermostat 600 may be controlled via the user interface 902 and/or the user interface 908. The user interface 902 is an a mobile application user interface which may be used on personal electronic devices such as smartphones or tablets. The user interface 908 is a web-based application user interface which may be accessed through any device connected to the Internet. In some embodiments, a network-based application may be used instead of a web-based application, and may allow users to control the thermostat 600 through any device which is connected to a local area network (LAN), regardless of Internet connectivity. It is understood that the embodiments described and shown in FIG. 9 are only a few of many different possibilities. In some embodiments, it is possible for a user to queue commands through the user interfaces 902-908 to send to the thermostat 600. In some embodiments, any combination of the above mentioned methods may be available options to control the thermostat 600.

Figure 10:
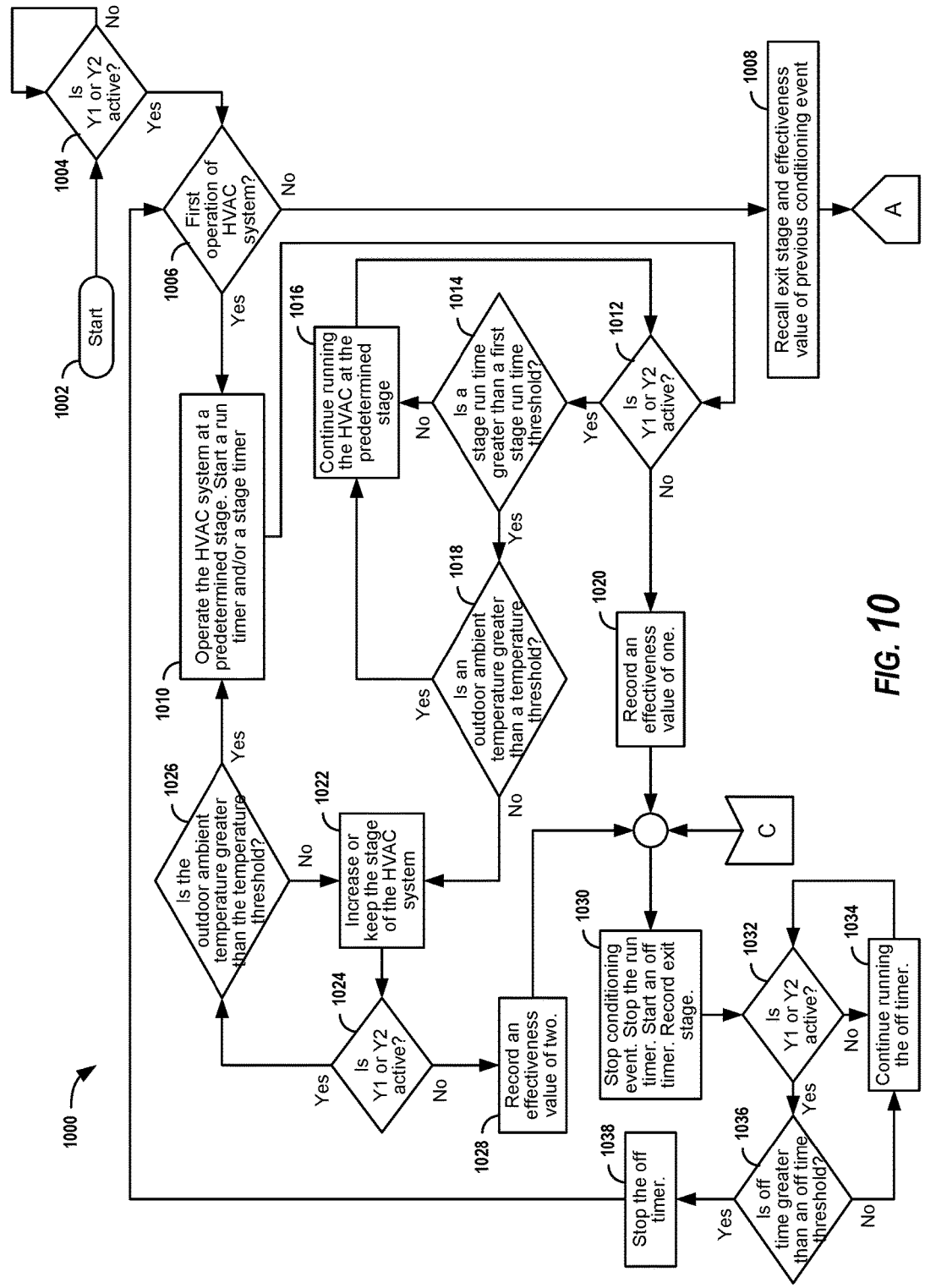
FIG. 10 is a flow diagram of a method for controlling an HVAC system with a thermostat during a first run operation of the HVAC system and/or first time experiencing operating conditions not previously experienced by the thermostat and/or HVAC system, according to an exemplary embodiment.

Referring now to FIG. 10, a method 1000 for controlling an HVAC system with a thermostat during a first run operation of the HVAC system and/or first time experiencing operating conditions not previously experienced by the thermostat and/or HVAC system is shown according to another example embodiment. Method 1000 corresponds with the thermostat 600 interpreting temperature data, run time data, off time data, and/or exit variables, to adaptively control a staging capability of an HVAC system (e.g., the HVAC system 42, the outdoor unit 30, etc.). According to the exemplary embodiment shown in FIG. 10, the thermostat 600 is configured to control and operate a five-stage HVAC system. However, the thermostat 600 may be used to control and operate any multi-stage (e.g., two-stage, ten-stage, etc.) HVAC system and/or a single-stage HVAC system. In one example embodiment, method 1000 may be implemented with the thermostat 600 of FIGS. 6-7 and the HVAC systems of FIGS. 1, 2, and/or 3. Accordingly, method 1000 may be described in regard to FIGS. 1-3 and 6-7.

At step 1002, the processing circuit 608 of the thermostat 600 is configured to start a staging algorithm for a multi-stage HVAC system (e.g., the HVAC system 42, etc.). Starting the staging algorithm may include the processing circuit 608 acquiring a current indoor ambient temperature of a building (e.g., the residence 24, etc.) via a first temperature sensor (e.g., the indoor temperature sensor 602, etc.), acquiring a current outdoor ambient temperature via a second temperature sensor (e.g., the indoor temperature sensor 602, etc.), and/or determining a desired temperature setpoint (e.g., based on a user input, a predefined schedule, etc.). At step 1004, the processing circuit 608 is configured to determine whether there is a need and/or a call for conditioning (e.g., the temperature setpoint differs from the current indoor ambient temperature, etc.). If a need and/or a call for conditioning is not present, the processing circuit 608 is configured to wait for a call for conditioning before proceeding.

At step 1006, the processing circuit 608 is configured to determine whether a current conditioning event is a first operation. In some embodiments, a first operation includes the first time the HVAC system is run following the install of the HVAC system and/or the thermostat 600. In some embodiments, a first operation includes the first time the HVAC system and/or the thermostat 600 is operating with certain conditions (e.g., an outdoor ambient temperature, a temperature differential, etc.). The processing circuit 608 is configured to operate the HVAC system at a predetermined stage of the multi-stage HVAC system in response to it being the first operation of the HVAC system and/or the thermostat 600 (step 1010). The predetermined stage may be defined by the installer, the manufacturer, and/or the user of the thermostat 600. According to an exemplary embodiment, the predetermined stage for a five-stage HVAC system is the fourth stage of operation. In other embodiments, the predetermined stage is another stage of operation of the HVAC system.

At step 1010, the processing circuit 608 may be further configured to start a run timer (e.g., to monitor the total duration of time of the current conditioning event, etc.) and/or a stage timer (e.g., to monitor the duration of time the current stage is active, etc.). Conversely, if it is not the first operation, the processing circuit 608 is configured to recall an exit stage and effectiveness value of a previous conditioning event with similar operating conditions (e.g., temperatures, temperature differentials, etc.) (step 1008) and proceed to method 1100 (see, e.g., FIGS. 11A-11B).

At step 1012, the processing circuit 608 is configured to determine whether there is still a need and/or a call for conditioning. At step 1014, the processing circuit 608 is configured to compare the stage run time to a first stage run time threshold (e.g., one hour, etc.). If the stage run time is less than the first stage run time threshold, the processing circuit 608 is configured to continue running at the predetermined stage (step 1016) and re-determine if the call or need for conditioning is met (e.g., the current indoor ambient temperature is substantially equal to the desired temperature setpoint, etc.)(step 1012). If a call for conditioning still exists, the processing circuit 608 is configured to repeat steps 1012-1016 until either the stage run time for the predetermined stage exceeds the first stage run time threshold or the call for conditioning is deactivated.

If the call for conditioning is deactivated, the processing circuit 608 is configured to record an effectiveness value of one (step 1020) since the call was met prior to the stage run time threshold being exceeded and the conditioning event is stopped (step 1030). At step 1030, the processing circuit 608 may be further configured to stop the run timer, start an off timer, and/or record the exit stage (e.g., the fourth stage of operation, the predetermined stage, etc.). If the call for conditioning is still active, and the stage run time exceeds the first stage run time threshold, the processing circuit 608 is configured to determine whether an outdoor ambient temperature is greater than a temperature threshold (e.g., via the outdoor temperature sensor 604, a high temperature threshold, 110 degrees Fahrenheit, etc.)(step 1018). If the outdoor ambient temperature exceeds the temperature threshold, the processing circuit 608 is configured to repeat steps 1012-1018 until either the outdoor ambient temperature drops below the temperature threshold or the call for conditioning is deactivated. If the ambient outdoor temperature drops below the temperature threshold, the processing circuit 608 is configured to increase the predetermined (current) stage of the HVAC system by one (e.g., from four to five, from eight to nine, etc.)(step 1022). If the call for conditioning is deactivated, the processing circuit 608 is configured to record an effectiveness value of one since the call was met without increasing the stage of the HVAC system (step 1020) and the conditioning event is stopped (step 1030).

In an alternative embodiment, if the call for conditioning is still active, and the stage run time exceeds the first stage run time threshold, the processing circuit 608 is configured to determine whether an outdoor ambient temperature is less than a second temperature threshold (e.g., via the outdoor temperature sensor 604, a low temperature threshold, −10 degrees Fahrenheit, etc.)(step 1018). If the outdoor ambient temperature is less than the second temperature threshold, the processing circuit 608 is configured to repeat steps 1012-1018 until either the outdoor ambient temperature increases above the second temperature threshold or the call for conditioning is deactivated. If the ambient outdoor temperature increases above the second temperature threshold, the processing circuit 608 is configured to increase the predetermined (current) stage of the HVAC system (e.g., from four to five, from eight to nine, etc.)(step 1022).

At step 1024, the processing circuit 608 is configured to determine whether there is still a need and/or a call for conditioning (e.g., the temperature setpoint differs from the current indoor ambient temperature, etc.) following the increase in staging (e.g., from the predetermined stage, etc.). At step 1026, the processing circuit 608 is configured to determine whether the outdoor ambient temperature has increased to become greater than the temperature threshold (or decreased to become less than the second temperature threshold). If the ambient outdoor temperature is still less than the temperature threshold (or greater than the second temperature threshold), the processing circuit 608 is configured to repeat steps 1022-1026 until either the outdoor ambient temperature increases to become greater than the temperature threshold (or decreases to become less than the second temperature threshold) or the call for conditioning is deactivated. In one embodiment, when returning to step 1022, the processing circuit 608 is configured to keep the HVAC system operating one stage above the predetermined stage. In other embodiments, when returning to step 1022, the processing circuit 608 is configured to increase the stage of the HVAC system by one after a time threshold is reached as long as the HVAC system is able to be operated at higher stages (e.g., two, three, etc. stages above the predetermined stage, etc.). If the outdoor ambient temperature increases to become greater than the temperature threshold (or decreases to become less than the second temperature threshold), the processing circuit 608 is configured to return to step 1010 to run the HVAC system at the original, predetermined stage (or a reduced stage if the stage of the HVAC system was increased by more than one). If the call for conditioning is deactivated, the processing circuit 608 is configured to record an effectiveness value of two (step 1028) and the conditioning event is stopped (step 1030). At step 1030, the processing circuit 608 may be further configured to stop the run timer, start an off timer, and/or record the exit stage (e.g., the fifth stage of operation, the increased stage, etc.).

At step 1032, the processing circuit 608 is configured to determine whether there is another need and/or a call for conditioning (e.g., the temperature setpoint differs from the current indoor ambient temperature once again, etc.) following the first conditioning event (steps 1002-1030). If there is no call for conditioning, the processing circuit 608 is configured to continue running the off timer (step 1034). If there is another call for conditioning, the processing circuit 608 is configured to compare the off time to an off time threshold (e.g., five minutes, etc.)(step 1036). If the off time is less than the off time threshold, the processing circuit 608 is configured to repeat steps 1032-1036. If the off time is greater than the off time threshold, the processing circuit 608 is configured to stop the off timer (step 1038) and return to step 1006.

Figure 11A:
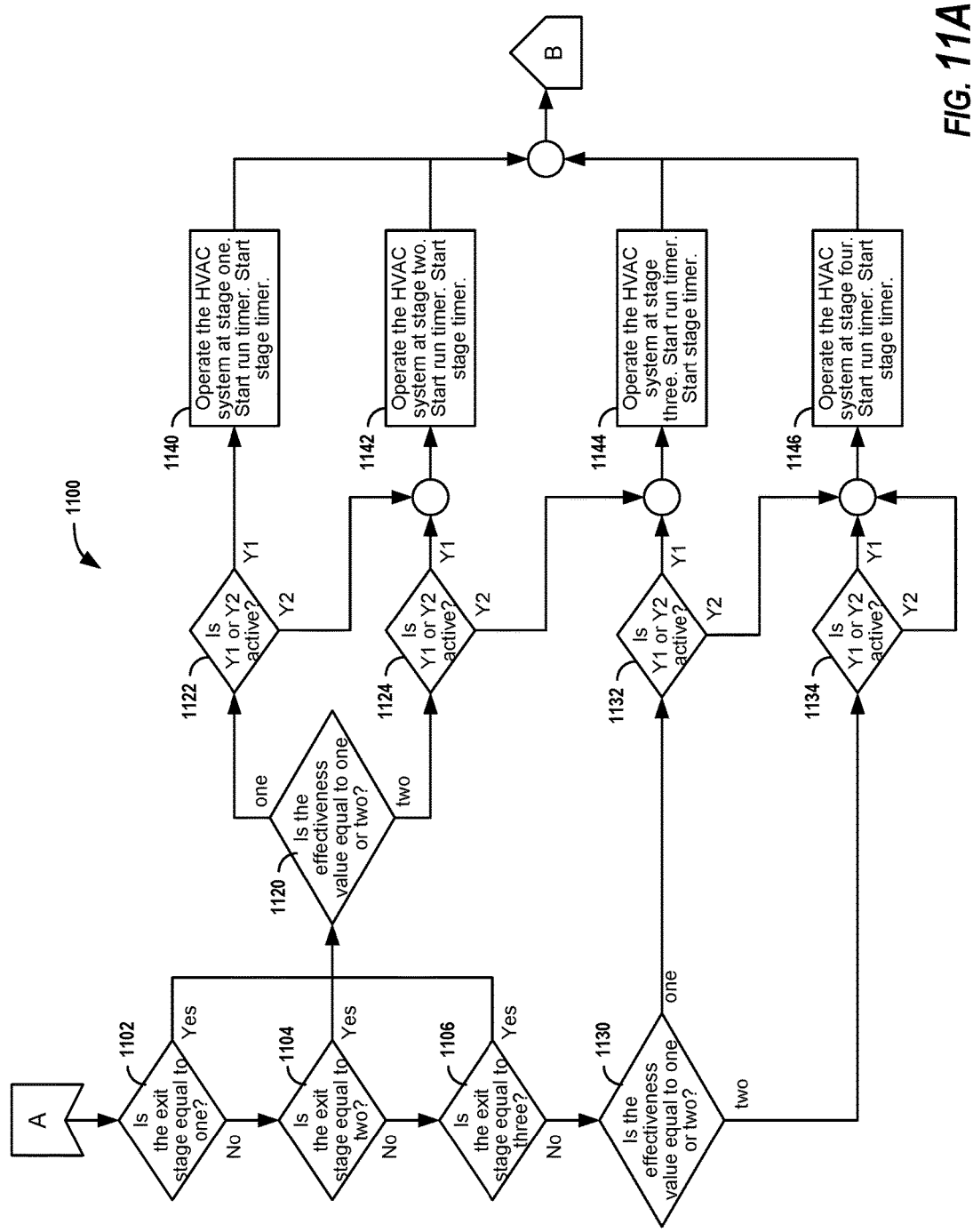
FIGS. 11A-11B are a flow diagram of a method for adaptively controlling an HVAC system with a thermostat following a first run operation of the HVAC system, according to an exemplary embodiment.
Figure 11B:
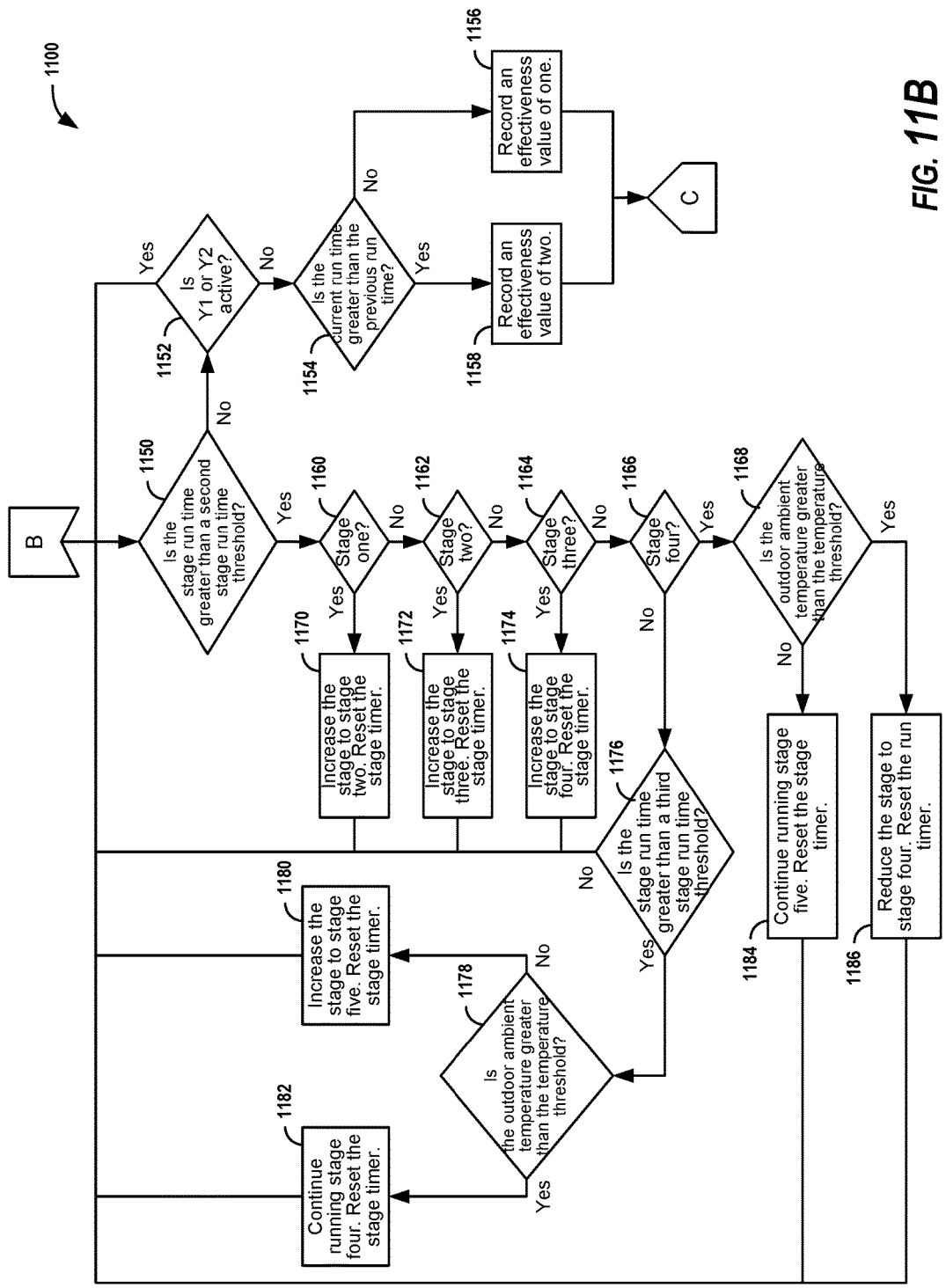

Referring now to FIGS. 11A-11B, a method 1100 for adaptively controlling an HVAC system with a thermostat following a first run operation of the HVAC system is shown according to an example embodiment. Method 1100 corresponds with the thermostat 600 interpreting temperature data, run time data, off time data, and/or exit variables, to adaptively control a staging capability of an HVAC system (e.g., the HVAC system 42, the outdoor unit 30, etc.). According to the exemplary embodiment shown in FIGS. 11A-11B, the thermostat 600 is configured to control and operate a five-stage HVAC system. However, the thermostat 600 may be used to control and operate any multi-stage (e.g., two-stage, ten-stage, etc.) HVAC system and/or a single-stage HVAC system. In one example embodiment, method 1100 may be implemented with the thermostat 600 of FIGS. 6-7 and the HVAC systems of FIGS. 1, 2, and/or 3. Accordingly, method 1100 may be described in regard to FIGS. 1-3 and 6-7.

Following steps 1002-1008 of method 1000 (see, e.g., FIG. 10), the processing circuit 608 has knowledge of the current indoor ambient temperature, the current outdoor ambient temperature, the desired temperature setpoint, and exit variables (e.g., exit stage, effectiveness value, etc.) of the last run conditioning event similar to the current conditioning event. At steps 1102-1106, the processing circuit 608 is configured to analyze the exit stage of the previous similar conditioning event. If the exit stage was one, two, or three (determined in steps 1102-1106), the processing circuit 608 proceeds to step 1120. If the exit stage was four or five (determined in step 1106), the processing circuit 608 proceeds to step 1130.

At step 1120, the processing circuit 608 is configured to analyze the effectiveness value of the previous similar conditioning event (e.g., whether the previous operation ran a longer time than the operation before that, or ran faster; whether the first operation met the call before the stage run time threshold or the current run time threshold were exceeded, etc.). If the effectiveness value is one, the processing circuit 608 proceeds to step 1122. If the effectiveness value is two, the processing circuit 608 proceeds to step 1124. At step 1122, the processing circuit 608 is configured to analyze the severity of the call for conditioning. If the call for conditioning has a relatively low severity (e.g., a Y1 call, close to satisfying the desired setpoint, etc.), the processing circuit 608 is configured to operate the HVAC system at stage one (step 1140). If the call for conditioning has a relatively high severity (e.g., a Y2 call, etc.), the processing circuit 608 is configured to operate the HVAC system at stage two (step 1142).

At step 1124, the processing circuit 608 is configured to analyze the severity of the call for conditioning. If the call for conditioning has a relatively low severity (e.g., a Y1 call, close to satisfying the desired setpoint, etc.), the processing circuit 608 is configured to operate the HVAC system at stage two (step 1142). If the call for conditioning has a relatively high severity (e.g., a Y2 call, etc.), the processing circuit 608 is configured to operate the HVAC system at stage three (step 1144).

At step 1130, the processing circuit 608 is configured to analyze the effectiveness value of the previous similar conditioning event (e.g., whether the previous operation ran at a longer time than the operation before that, or ran faster; whether the first operation met the call before the stage run time threshold or the current run time threshold were exceeded, etc.). If the effectiveness value is one, the processing circuit 608 proceeds to step 1132. If the effectiveness value is two, the processing circuit 608 proceeds to step 1134. At step 1132, the processing circuit 608 is configured to analyze the severity of the call for conditioning. If the call for conditioning has a relatively low severity (e.g., a Y1 call, close to satisfying the desired setpoint, etc.), the processing circuit 608 is configured to operate the HVAC system at stage three (step 1144). If the call for conditioning has a relatively high severity (e.g., a Y2 call, etc.), the processing circuit 608 is configured to operate the HVAC system at stage four (step 1146). At step 1134, the processing circuit 608 is configured to analyze the severity of the call for conditioning. If the call for conditioning has a relatively low severity or a relatively high severity, the processing circuit 608 is configured to operate the HVAC system at stage four (step 1146). In some embodiments, the processing circuit 608 is configured to operate the HVAC system at stage five when the exit stage is five, the effectiveness value is two, and the severity of the call for conditioning is a Y2 call. At each of steps 1140-1146, the processing circuit 608 is configured to start a run timer and a stage timer.

At step 1150, the processing circuit 608 is configured to compare the stage run time to a second stage run time threshold. In one embodiment, the second stage run time threshold is ten minutes. In other embodiments, the second stage run time threshold is the same or substantially the same the first stage run time threshold. If the stage run time is less than the second stage run time threshold, the processing circuit 608 is configured to determine if a call for conditioning is still active (e.g., whether the temperature setpoint is reached, etc.)(step 1152). If the call for conditioning is still active, the processing circuit 608 returns to step 1150. If the call for conditioning is deactivated, the processing circuit 608 is configured to compare the current run time for the conditioning event to the previous run time for the last run conditioning event similar to the current conditioning event (step 1154). If the current run time is less than the previous run time (e.g., more efficient operation, etc.), the processing circuit 608 is configured to record an effectiveness value of one (step 1156) and return to step 1030 of method 1000. If the current run time is greater than the previous run time (e.g., less efficient operation, etc.), the processing circuit 608 is configured to record an effectiveness value of two (step 1158) and return to step 1030 of method 1000.

Returning to step 1150, if the stage run time is greater than the second stage run time threshold, the processing circuit 608 is configured to determine the stage the HVAC system is currently operating at (steps 1160-1166). If the stage of the HVAC system is one, two, or three (steps 1160-1164), the processing circuit 608 is configured to increase the stage by one (e.g., from stage one to two, two to three, three to four, etc.) and reset the stage timer (steps 1170-1174), and then return to step 1150. If the stage of the HVAC system is four (step 1166), the processing circuit 608 is configured to compare the stage run time during the fourth stage to a third stage run time threshold (step 1176). In one embodiment, the third stage run time threshold is forty minutes. In other embodiments, the third stage run time threshold is the same or substantially the same as at least one of the first stage run time threshold and the second stage run time threshold.

If the stage run time is less than the third stage run time threshold, the processing circuit 608 is configured to return to step 1150. If the stage run time is greater than the third stage run time threshold, the processing circuit 608 is configured to determine whether the outdoor ambient temperature is greater than the temperature threshold (or less than the second temperature threshold)(step 1178). If the ambient outdoor temperature is less than the temperature threshold (or greater than the second temperature threshold), the processing circuit 608 is configured to increase the stage of the HVAC system (e.g., from stage four to five, etc.) and reset the stage timer (step 1180), and then return to step 1150. If the ambient outdoor temperature is greater than the temperature threshold (or less than the second temperature threshold), the processing circuit 608 is configured to continue running the HVAC system at the current stage (e.g., stage four, etc.) and reset the stage timer (step 1182), and then return to step 1150.

If the stage of the HVAC system is five (determined in step 1166), the processing circuit 608 is configured to determine whether the outdoor ambient temperature is greater than the temperature threshold (or less than the second temperature threshold)(step 1168). If the ambient outdoor temperature is less than the temperature threshold (or greater than the second temperature threshold), the processing circuit 608 is configured to continue running the HVAC system as the current stage (e.g., stage five, etc.) and reset the stage timer (steps 1184), and then return to step 1150. If the ambient outdoor temperature is greater than the temperature threshold (or less than the second temperature threshold), the processing circuit 608 is configured to reduce the stage of the HVAC system (e.g., from stage five to stage four, etc.) and reset the run timer (step 1186), and then return to step 1150 (which causes the stage timer to reset as the processing circuit 608 will progress to step 1182 based on the current conditions).

Figure 12:
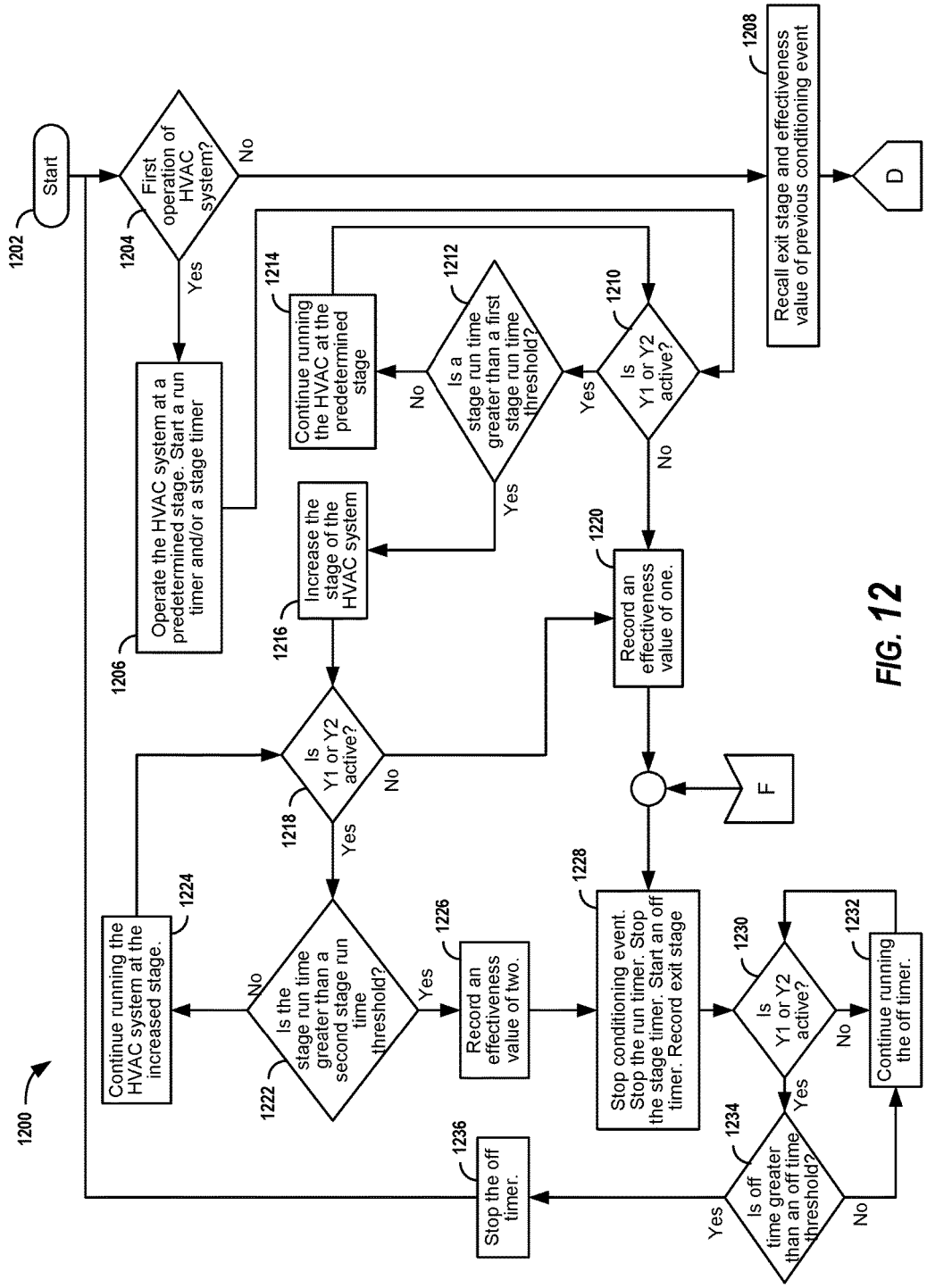
FIG. 12 is a flow diagram of a method for controlling an HVAC system with a thermostat during a first run operation of the HVAC system and/or first time experiencing operating conditions not previously experienced by the thermostat and/or HVAC system, according to another exemplary embodiment.

Referring now to FIG. 12, a method 1200 for controlling an HVAC system with a thermostat during a first run operation of the HVAC system and/or first time experiencing operating conditions not previously experienced by the thermostat and/or HVAC system is shown according to another example embodiment. Method 1200 corresponds with the thermostat 600 interpreting temperature data, run time data, off time data, and/or exit variables, to adaptively control a staging capability of an HVAC system (e.g., the HVAC system 42, the outdoor unit 30, etc.). According to the exemplary embodiment shown in FIG. 12, the thermostat 600 is configured to control and operate a five-stage HVAC system. However, the thermostat 600 may be used to control and operate any multi-stage (e.g., two-stage, ten-stage, etc.) HVAC system and/or a single-stage HVAC system. In one example embodiment, method 1200 may be implemented with the thermostat 600 of FIGS. 6-7 and the HVAC systems of FIGS. 1, 2, and/or 3. Accordingly, method 1200 may be described in regard to FIGS. 1-3 and 6-7.

At step 1202, the processing circuit 608 of the thermostat 600 is configured to start a staging algorithm for a multi-stage HVAC system (e.g., the HVAC system 42, etc.). Starting the staging algorithm may include the processing circuit 608 acquiring a current indoor ambient temperature of a building (e.g., the residence 24, etc.) via a first temperature sensor (e.g., the indoor temperature sensor 602, etc.), acquiring a current outdoor ambient temperature via a second temperature sensor (e.g., the indoor temperature sensor 602, etc.), and/or determining a desired temperature setpoint (e.g., based on a user input, a predefined schedule, etc.).

At step 1204, the processing circuit 608 is configured to determine whether a current conditioning event is a first operation. The processing circuit 608 is configured to operate the HVAC system at a predetermined stage of the multi-stage HVAC system in response to it being the first operation of the HVAC system and/or the thermostat 600 (step 1206). At step 1206, the processing circuit 608 may be further configured to start a run timer (e.g., to monitor the total duration of time of the current conditioning event, etc.) and/or a stage timer (e.g., to monitor the duration of time the current stage is active, etc.). Conversely, if it is not the first operation, the processing circuit 608 is configured to recall an exit stage and effectiveness value of a previous conditioning event with similar operating conditions (e.g., temperatures, temperature differentials, etc.) (step 1208) and proceed to method 1300 (see, e.g., FIGS. 13A-13B).

At step 1210, the processing circuit 608 is configured to determine whether there is a need and/or a call for conditioning (e.g., the temperature setpoint differs from the current indoor ambient temperature, etc.). In some embodiments, step 1210 comes before step 1206. At step 1212, the processing circuit 608 is configured to compare the stage run time to a stage run time threshold (e.g., one hour, etc.). If the stage run time is less than the stage run time threshold, the processing circuit 608 is configured to continue running at the predetermined stage (step 1214) and re-determine if the call or need for conditioning is met (e.g., the current indoor ambient temperature is substantially equal to the desired temperature setpoint, etc.)(step 1210). If a call for conditioning still exists (step 1210), the processing circuit 608 is configured to repeat step 1210-1214 until either the stage run time for the predetermined stage exceeds the stage run time threshold or the call for conditioning is deactivated. Advantageously, this may substantially limit the time spent in a higher or maximum stage which may not be an ideal long term operating solution for the HVAC system.

If the call for conditioning is deactivated, the processing circuit 608 is configured to record an effectiveness value of one since the call was met prior to the stage run time threshold being exceeded (step 1220) and the conditioning event is stopped (step 1228). At step 1228, the processing circuit 608 may be further configured to stop the run timer, stop the stage timer, start an off timer, and record the exit stage (e.g., the fourth stage of operation, the predetermined stage, etc.). If the call for conditioning is still active, and the stage run time exceeds the stage run time threshold, the processing circuit 608 is configured to increase the predetermined stage by one (e.g., from four to five, from eight to nine, etc.) and start a new stage timer (step 1216).

At step 1218, the processing circuit 608 is configured to determine whether there is still a need and/or a call for conditioning (e.g., the temperature setpoint differs from the current indoor ambient temperature, etc.) following the increase in staging. At step 1222, the processing circuit 608 is configured to compare the stage run time to a second stage run time threshold (e.g., thirty minutes, etc.). In one embodiment, the first stage run time threshold and the second stage run time thresholds are different. In other embodiments, the first stage run time threshold and the second stage run time threshold are the same. If the stage run time is less than the second stage run time threshold, the processing circuit 608 is configured to continue running at the increased stage (step 1224) and then re-determine if the call or need for conditioning is met (e.g., the current indoor ambient temperature is substantially equal to the desired temperature setpoint, etc.)(step 1218). If a call for conditioning still exists (step 1218), the processing circuit 608 is configured to repeat step 1218, 1222, and 1224 until either the stage run time for the increased stage exceeds the stage run time threshold or the call for conditioning is deactivated.

If the call for conditioning is deactivated, the processing circuit 608 is configured to record an effectiveness value of one since the call was met prior to the second stage run time threshold and/or a current run time threshold (e.g., ninety minutes, etc.) being exceeded (step 1220) and the conditioning event is stopped (step 1228). At step 1228, the processing circuit 608 may be further configured to stop the run timer, stop the stage timer, start an off timer, and record the exit stage (e.g., the fifth stage of operation, the increased stage, etc.). If the call for conditioning is still active, and the stage run time exceeds the second stage run time threshold and/or the current run time exceeds the current run time threshold, the processing circuit 608 is configured to record an effectiveness value of two since the call was not met prior to the second stage run time threshold and/or the current run time threshold being exceeded (step 1226) and the conditioning event is stopped (step 1228).

At step 1230, the processing circuit 608 is configured to determine whether there is another need and/or a call for conditioning (e.g., the temperature setpoint differs from the current indoor ambient temperature once again, etc.) following the first conditioning event (steps 1202-1228). If there is no call for conditioning, the processing circuit 608 is configured to continue running the off timer (step 1232). If there is another call for conditioning, the processing circuit 608 is configured to compare the off time to an off time threshold (e.g., five minutes, etc.)(step 1234). If the off time is less than the off time threshold, the processing circuit 608 is configured to repeat steps 1230-1234. If the off time is greater than the off time threshold, the processing circuit 608 is configured to stop the off timer (step 1236) and return to step 1202.

Figure 13A:
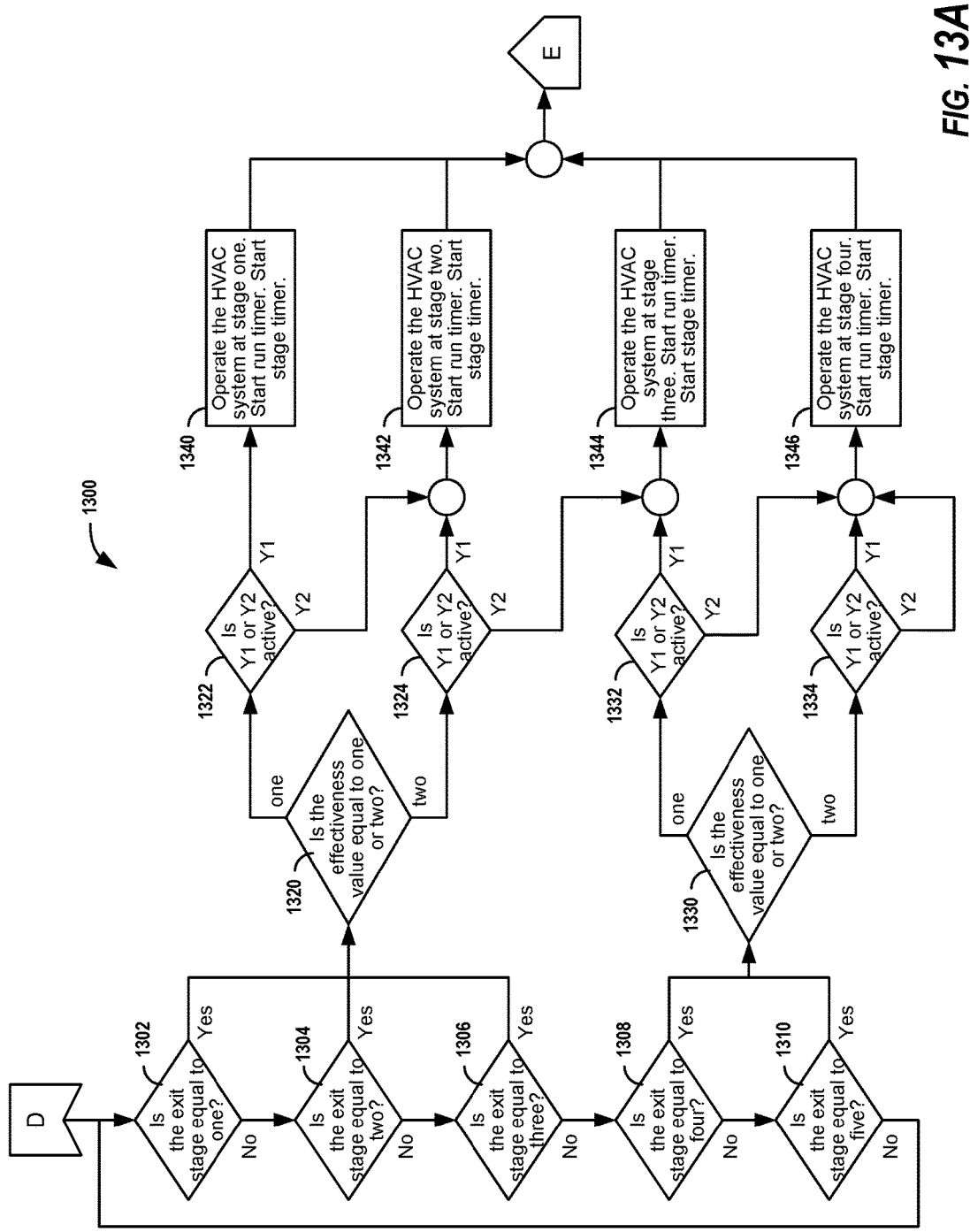
FIGS. 13A-13B are a flow diagram of a method for adaptively controlling an HVAC system with a thermostat following a first run operation of the HVAC system, according to another exemplary embodiment.
Figure 13B:
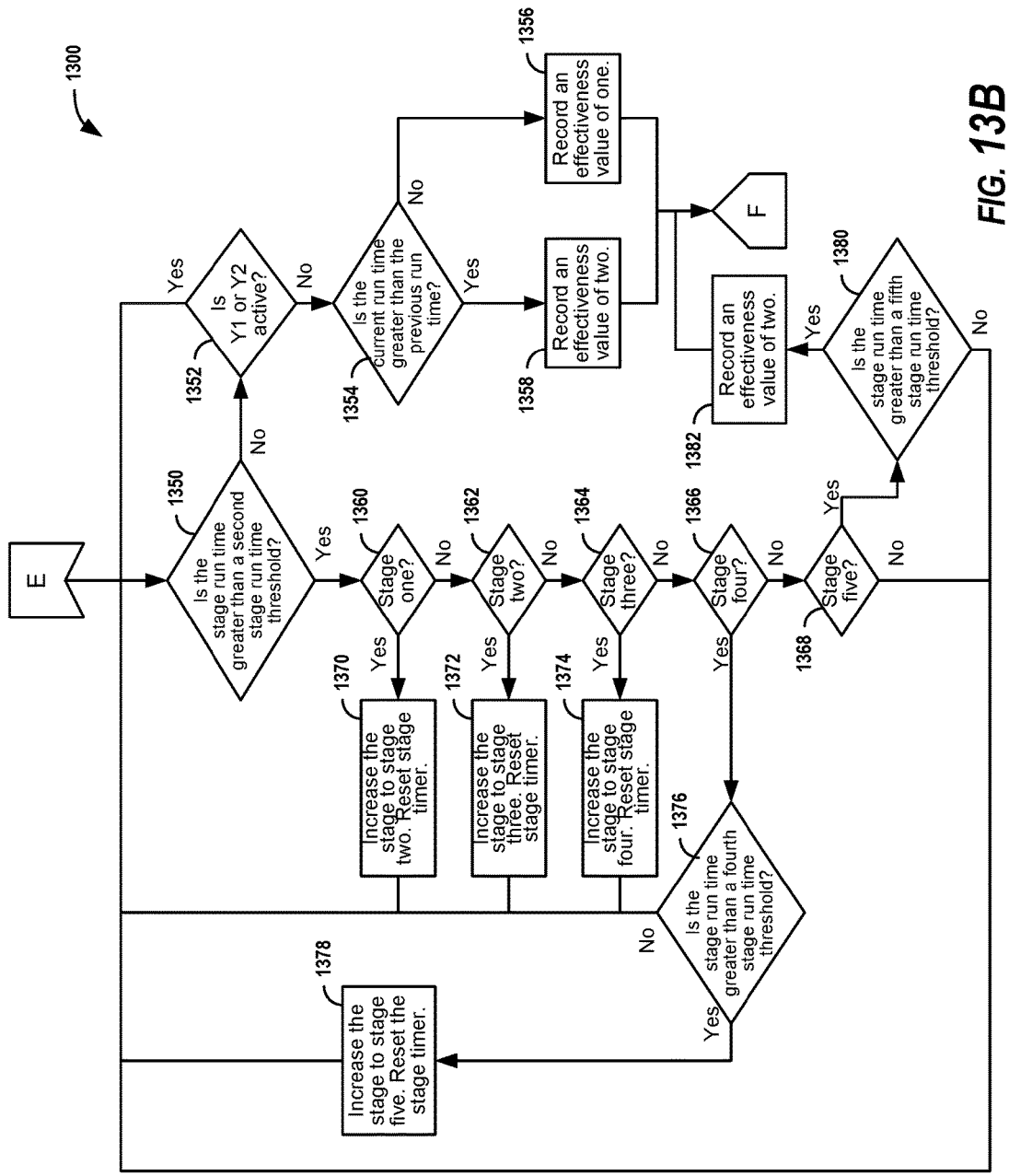

Referring now to FIGS. 13A-13B, a method 1300 for adaptively controlling an HVAC system with a thermostat following a first run operation of the HVAC system is shown according to another example embodiment. Method 1300 corresponds with the thermostat 600 interpreting temperature data, run time data, off time data, and/or exit variables, to adaptively control a staging capability of an HVAC system (e.g., the HVAC system 42, the outdoor unit 30, etc.). According to the exemplary embodiment shown in FIGS. 13A-13B, the thermostat 600 is configured to control and operate a five-stage HVAC system. However, the thermostat 600 may be used to control and operate any multi-stage (e.g., two-stage, ten-stage, etc.) HVAC system and/or a single-stage HVAC system. In one example embodiment, method 1300 may be implemented with the thermostat 600 of FIGS. 6-7 and the HVAC systems of FIGS. 1, 2, and/or 3. Accordingly, method 1300 may be described in regard to FIGS. 1-3 and 6-7.

Following steps 1202-1208 of method 1200 (see, e.g., FIG. 12), the processing circuit 608 has knowledge of the current indoor ambient temperature, the current outdoor ambient temperature, the desired temperature setpoint, and exit variables (e.g., exit stage, effectiveness value, etc.) of the last run conditioning event similar to the current conditioning event. At steps 1302-1310, the processing circuit 608 is configured to analyze the exit stage of the previous similar conditioning event. If the exit stage was one, two, or three (determined in steps 1302-1306), the processing circuit 608 proceeds to step 1320. If the exit stage was four or five (determined in steps 1308-1310), the processing circuit 608 proceeds to step 1330.

At step 1320, the processing circuit 608 is configured to analyze the effectiveness value of the previous similar conditioning event (e.g., whether the previous operation ran at a longer time than the operation before that, or ran faster; whether the first operation met the call before the stage run time threshold or the current run time threshold were exceeded, etc.). If the effectiveness value is one, the processing circuit 608 proceeds to step 1322. If the effectiveness value is two, the processing circuit 608 proceeds to step 1324. At step 1322, the processing circuit 608 is configured to analyze the severity of the call for conditioning. If the call for conditioning has a relatively low severity (e.g., a Y1 call, close to satisfying the desired setpoint, etc.), the processing circuit 608 is configured to operate the HVAC system at stage one (step 1340). If the call for conditioning has a relatively high severity (e.g., a Y2 call, etc.), the processing circuit 608 is configured to operate the HVAC system at stage two (step 1342).

At step 1324, the processing circuit 608 is configured to analyze the severity of the call for conditioning. If the call for conditioning has a relatively low severity (e.g., a Y1 call, close to satisfying the desired setpoint, etc.), the processing circuit 608 is configured to operate the HVAC system at stage two (step 1342). If the call for conditioning has a relatively high severity (e.g., a Y2 call, etc.), the processing circuit 608 is configured to operate the HVAC system at stage three (step 1344).

At step 1330, the processing circuit 608 is configured to analyze the effectiveness value of the previous similar conditioning event (e.g., whether the previous operation ran at a longer time than the operation before that, or ran faster; whether the first operation met the call before the stage run time threshold or the current run time threshold were exceeded, etc.). If the effectiveness value is one, the processing circuit 608 proceeds to step 1332. If the effectiveness value is two, the processing circuit 608 proceeds to step 1334. At step 1332, the processing circuit 608 is configured to analyze the severity of the call for conditioning. If the call for conditioning has a relatively low severity (e.g., a Y1 call, close to satisfying the desired setpoint, etc.), the processing circuit 608 is configured to operate the HVAC system at stage three (step 1344). If the call for conditioning has a relatively high severity (e.g., a Y2 call, etc.), the processing circuit 608 is configured to operate the HVAC system at stage four (step 1346). At step 1334, the processing circuit 608 is configured to analyze the severity of the call for conditioning. If the call for conditioning has a relatively low severity or a relatively high severity, the processing circuit 608 is configured to operate the HVAC system at stage four (step 1346). In some embodiments, the processing circuit 608 is configured to operate the HVAC system at stage five when the exit stage is five, the effectiveness value is two, and the severity of the call for conditioning is a Y2 call. At each of steps 1340-1346, the processing circuit 608 is configured to start a run timer and a stage timer.

At step 1350, the processing circuit 608 is configured to compare the stage run time to a third stage run time threshold. In one embodiment, the third stage run time threshold is ten minutes. In other embodiments, the third stage run time threshold is the same or substantially the same as at least one of the first stage run time threshold and the second stage run time threshold. If the stage run time is less than the third stage run time threshold, the processing circuit 608 is configured to determine if a call for conditioning is still active (e.g., whether the temperature setpoint is reached, etc.)(step 1352). If the call for conditioning is still active, the processing circuit 608 returns to step 1350. If the call for conditioning is deactivated, the processing circuit 608 is configured to compare the current run time for the conditioning event to the previous run time for the last run conditioning event similar to the current conditioning event (step 1354). If the current run time is less than the previous run time (e.g., more efficient operation, etc.), the processing circuit 608 is configured to record an effectiveness value of one (step 1356) and return to step 1228 of method 1200. If the current run time is greater than the previous run time (e.g., less efficient operation, etc.), the processing circuit 608 is configured to record an effectiveness value of two (step 1358) and return to step 1228 of method 1200.

Returning to step 1350, if the stage run time is greater than the third stage run time threshold, the processing circuit 608 is configured to determine the stage the HVAC system is operating at (steps 1360-1368). If the stage of the HVAC system is one, two, or three (steps 1360-1364), the processing circuit 608 is configured to increase the stage by one (e.g., from stage one to two, two to three, three to four, etc.) and reset the stage timer (steps 1370-1374), and then return to step 1350. If the stage of the HVAC system is four (step 1366), the processing circuit 608 is configured to compare the stage run time during the fourth stage to a fourth stage run time threshold (step 1376). In one embodiment, the fourth stage run time threshold is forty minutes. In other embodiments, the fourth stage run time threshold is the same or substantially the same as at least one of the first stage run time threshold, the second stage run time threshold, and the third stage run time threshold. If the stage run time is less than the fourth stage run time threshold, the processing circuit 608 is configured to return to step 1350. If the stage run time is greater than the fourth stage run time threshold, the processing circuit 608 is configured to increase the stage by one (e.g., from stage four to five, etc.) and reset the stage timer (steps 1378), and then return to step 1350.

If the stage of the HVAC system is five (step 1368), the processing circuit 608 is configured to compare the stage run time during the fifth stage to a fifth stage run time threshold (step 1380). In one embodiment, the fifth stage run time threshold is thirty minutes. In other embodiments, the fifth stage run time threshold is the same or substantially the same as at least one of the first stage run time threshold, the second stage run time threshold, the third stage run time threshold, and the fourth stage run time threshold. If the stage run time is less than the fifth stage run time threshold, the processing circuit 608 is configured to return to step 1350. If the stage run time threshold is greater than the fifth stage run time threshold, the processing circuit 608 is configured to record an effectiveness variable of two (step 1382) and return to step 1228 of method 1200.

An additional improvement effort in methods 1000, 1100, 1200 and/or 1300 may include a post-run sequence where the HVAC system stages down after the temperature setpoint is reached and/or the current time threshold is exceeded. The post-run sequence may provide the HVAC system with the ability to continue heating or cooling the building for a period of time (e.g., five minutes, ten minutes, etc.) to facilitate improved conditioning based on the additional energy expended. The post-run sequence may increase a time gap between on-cycles of the HVAC system while also reducing energy consumption due to lower staging, thereby providing increased and more efficient conditioning to the building.

An example operation may be as follows. If either a Y1 call or a Y2 call are present, current outdoor ambient temperature is recorded (e.g., by the thermostat 600 via the outdoor temperature sensor 604, etc.). The memory of the thermostat 600 is scanned for a current outdoor ambient temperature value match. If a match is found, the HVAC system is run at the exit stage of the match, and run time and stage run time are monitored, until one of the following events occur: (i) the Y1 call or Y2 call is deactivated (i.e., the temperature setpoint is reached), and (ii) the current run time exceeds the previous run time (e.g., for subsequent operations, of the matched operation, etc.) and/or the current run time threshold (e.g., for first time operations, etc.).

If the Y1 call or the Y2 call is deactivated, the processing circuit 608 is configured to determine the current stage. If the current stage is the minimum stage (e.g., stage one, etc.), the processing circuit 608 is configured to continue to run the HVAC system in the minimum stage for a post-run operation (e.g., for a predetermined period of time, five minutes, etc.). If the current stage is not the minimum stage, the processing circuit 608 is configured to ramp down the stage of the HVAC system to the next lower stage (e.g., go from stage four to stage three, etc.) for the post-run operation. After the post-run operation, the processing circuit 608 may be configured to stop the run time counter, and begin the off time counter (e.g., with a minimum off delay, etc.). The processing circuit 608 is then configured to stop the off-time counter at the beginning of the next Y1 or Y2 call. The processing circuit 608 is configured to check if records associated with the previous outside ambient temperature (e.g., associated with the current outdoor ambient temperature, etc.) has a recorded off-time counter. If no, the processing circuit 608 is configured to record the off-time counter for that outdoor ambient temperature. If yes, the processing circuit 608 is configured to check if the current off-time counter is longer than the recorded off-time counter (e.g., by at least five minutes, etc.). If yes, the processing circuit 608 is configured to overwrite the previous off-time counter with current (new) off-time counter. If no, the processing circuit 608 is configured to erase the current off-time counter and leave previous off-time counter.

If the current run time exceeds the previous run time and/or the current run time threshold, the processing circuit 608 is configured to determine the current stage. If the current stage is not the maximum stage (e.g., stage five, etc.), the processing circuit 608 may be configured to ramp up the HVAC system to next higher stage (e.g., go from stage four to stage five, etc.) for a period of time (e.g., five minutes, etc.). If the current stage is the maximum stage, the processing circuit 608 is configured to continue running the HVAC system at the maximum stage for a period of time (e.g., five minutes, etc.). In some embodiments, the processing circuit 608 is configured to limit the number of "re-run" cycles at the maximum stage (e.g., to five times, twenty-five minutes, etc.) if the temperature setpoint is still not reached. If the maximum number of re-run cycles is reached, the processing circuit 608 is configured to begin the post-run operation at the maximum stage (e.g., the maximum stage, stage five, etc.) for a period of time (e.g., five minutes, etc.). If the Y1 call or the Y2 call is satisfied prior to the re-run limit being reached, during the post-run operation at the maximum stage, and/or following ramping up the stage, the processing circuit 608 is configured to begin or re-run the post-run operation at the current stage for an additional period of time (e.g., five minutes, etc.). After the post-run operation, the processing circuit 608 may be configured to at least one of stop the run-time counter, begin the off-time counter, reset the re-run value, overwrite the existing stage value, and overwrite the time value associated with outdoor ambient temperature.

The conditions in which data values associated with temperatures stay in the memory of the processing circuit 608 are important. Possible concerns may come from changes in variables other than the outdoor ambient temperature. For example, large groups of people in the building, extended use of cooking or oven use, doors and/or windows opened for extended periods of time, may affect the efficiency of the HVAC system to provide conditioning. In one embodiment, the current data for a temperature always overwrites the pre-existing data set. Thus, any Y call will trigger the previous Y call staging based on that temperature. If the temperature setpoint was reached quicker, the new data may replace old data in the memory, just as if the setpoint took longer to reach, the new data may still replace the old data in the memory as well. In other embodiments, the current data for a temperature may or may not overwrite the pre-existing data set. If the temperature setpoint was reached quicker, the new data may replace old data in the memory. However, if the setpoint took longer to reach, the new data may not replace the old data in the memory (e.g., other factors may be in play such as the concerns listed above, etc.).

For example, for an outdoor ambient temperature of eighty degrees, the processing circuit 608 may recall an exit stage of four, a twelve minute run time, and a ten minute off time. A Y1 call becomes active (e.g., based on a deviation from the temperature setpoint, a user initiating a conditioning cycle, etc.). The processing circuit 608 may be configured to operate the HVAC system at stage four until either twelve minutes pass or the Y1 call is satisfied.

If twelve minutes pass, this indicates that the building is taking longer to condition than it did previously at the same outdoor ambient temperature. Thus, other factors may be at play. The processing circuit 608 advances to next stage (e.g., stage five, etc.) in an attempt to satisfy the call. Two conditions may result: either the Y call will be satisfied in the increased stage within the stage run time threshold or it will not. The reason for not running the stage too long is that if the outdoor ambient temperature is continuing to increase over longer periods of time, overwriting the data won't be reflective of the initial outdoor ambient temperature. If the call is satisfied in the increased stage, these new values may overwrite the current data for the outdoor ambient temperature of eighty degrees. Thus, the processing circuit 608 may now attempt to start the HVAC system in the increased stage the next time.

If the Y call is satisfied prior to the twelve minutes, this indicates that the temperature setpoint was reached faster than the previous run time for that temperature. This also means that the HVAC system could have potentially conditioned at a lower stage to save energy. Because of this, the post-run operation will operate in a lower stage (with the exception of stage one, which will remain stage one), and be the exit stage. This means that if/when the data is overwritten for the outdoor ambient temperature of eighty degrees, the processing circuit 608 may attempt the lower stage of the post-run operation the next time. Thus starting at stage four, successfully cooling in time, then staging down to stage three would occur. This means the next attempt at that temperature is to run stage three. If the stage three also cools faster at that temperature, the processing circuit 608 would stage down to stage two and repeat.

The adaptive efficiency part of algorithm may operate as follows. Initial operation for a given temperature (no record present) may not perform post-run operation. After initial operation takes place, data is stored. This includes the exit stage, the run time, the off time, and the Y call. Non-initial records may include exit variable (under what condition the unit stopped) in order to determine operation during next call. This exit variable (two options) represents whether operation was shorter or longer than the previous run operation. When non-initial operation demand is present, post-run operation may occur in an effort for energy savings. If energy savings are present, then this operation may overwrite initial data stored for that temperature. Additional post-run staging is a possibility at this point to try for more energy savings. If the prior does not occur, a modified version of the post-run stage may take place where the post-run stage remains at the same as the operation stage during the next operation cycle. If the modified post-run stage does not prove satisfactory, that operation may overwrite the most recent data for that temperature. By overwriting data with the "worst case scenario", it allows the HVAC system to run at higher staging in future options.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A thermostat communicably and operatively coupled to a multi-stage heating, ventilating, and air conditioning (HVAC) system operable in a plurality of stages, the thermostat comprising:

a memory configured to store operating conditions for previously run conditioning events of the multi-stage HVAC system; and
   a controller configured to:
      receive first temperature data from a first temperature sensor indicative of a current indoor ambient temperature inside a building;
      receive second temperature data from a second temperature sensor indicative of a current outdoor ambient temperature outside of the building;
      receive a temperature setpoint for a desired indoor ambient temperature of the building;
      determine a severity of a call for conditioning for a current conditioning event based on at least one of the current indoor ambient temperature, the current outdoor ambient temperature, and the temperature setpoint;
      operate the multi-stage HVAC system in one of the plurality of stages for the current conditioning event based on the severity of the call for conditioning for the current conditioning event and the operating conditions for a respective previously run conditioning event to drive the current indoor ambient temperature towards the temperature setpoint; and
      increase the one of the plurality of stages of the multi-stage HVAC system in response to a stage run time exceeding a stage run time threshold.

2. The thermostat of claim 1, wherein the thermostat is a non-communicating thermostat such that the thermostat does not communicate with external systems or components outside of the HVAC system.

3. The thermostat of claim 1, wherein the operating conditions for the previously run conditioning events include at least one of an outdoor ambient temperature, an exit stage, a run time, a stage run time, and an effectiveness value.

4. The thermostat of claim 3, wherein the controller is configured to determine the one of the plurality of stages for the current conditioning event to operate the multi-stage HVAC system at based on the exit stage and the effectiveness value of the respective previously run conditioning event, wherein the outdoor ambient temperature for the respective previously run conditioning event is substantially similar to the current outdoor ambient temperature.

5. The thermostat of claim 4, wherein the controller is further configured to update the operating conditions for the respective previously run conditioning event with the operating conditions of the current conditioning event in response to the current conditioning event having an improved effectiveness value relative to the effectiveness value of the respective previously run conditioning event to adaptively control the multi-stage HVAC system in subsequent conditioning events.

6. The thermostat of claim 1, further comprising the first temperature sensor, wherein the first temperature sensor is configured to acquire the first temperature data.

7. The thermostat of claim 1, further comprising a user interface configured to facilitate at least one of entering the temperature setpoint and setting a schedule including the temperature setpoint.

8. The thermostat of claim 1, wherein the controller is communicably coupled to the second temperature sensor, wherein the second temperature sensor is positioned externally from the thermostat, and wherein the second temperature sensor is configured to acquire the second temperature data.

9. A thermostat communicably and operatively coupled to a multi-stage heating, ventilating, and air conditioning (HVAC) system operable in a plurality of stages, the thermostat comprising:
a memory configured to store operating conditions for previously run conditioning events of the multi-stage HVAC system; and
a controller configured to:
receive first temperature data from a first temperature sensor indicative of a current indoor ambient temperature inside a building;
receive second temperature data from a second temperature sensor indicative of a current outdoor ambient temperature outside of the building;
receive a temperature setpoint for a desired indoor ambient temperature of the building;
determine a severity of a call for conditioning for a current conditioning event based on at least one of the current indoor ambient temperature, the current outdoor ambient temperature, and the temperature setpoint;
operate the multi-stage HVAC system in one of the plurality of stages for the current conditioning event based on the severity of the call for conditioning for the current conditioning event and the operating conditions for a respective previously run conditioning event to drive the current indoor ambient temperature towards the temperature setpoint; and
decrease the one of the plurality of stages of the multi-stage HVAC system in response to the current outdoor ambient temperature exceeding a temperature threshold when the multi-stage HVAC system is operating above a predetermined stage.

10. A thermostat communicably and operatively coupled to a multi-stage heating, ventilating, and air conditioning (HVAC) system operable in a plurality of stages, the thermostat comprising:
a memory configured to store operating conditions for previously run conditioning events of the multi-stage HVAC system; and
a controller configured to:
receive first temperature data from a first temperature sensor indicative of a current indoor ambient temperature inside a building;
receive second temperature data from a second temperature sensor indicative of a current outdoor ambient temperature outside of the building;
receive a temperature setpoint for a desired indoor ambient temperature of the building;
determine a severity of a call for conditioning for a current conditioning event based on at least one of the current indoor ambient temperature, the current outdoor ambient temperature, and the temperature setpoint;
operate the multi-stage HVAC system in one of the plurality of stages for the current conditioning event based on the severity of the call for conditioning for the current conditioning event and the operating conditions for a respective previously run conditioning event to drive the current indoor ambient temperature towards the temperature setpoint; and
operate the multi-stage HVAC system according to a post-run sequence for a period of time in response to at least one of the call for conditioning being satisfied, a run time of the current conditioning event exceeding a previous run time of the respective previously run conditioning event, and the run time of the current conditioning event exceeding a current run time threshold.

11. The thermostat of claim 10, wherein the controller is configured to at least one of keep the one of the plurality of stages of the multi-stage HVAC system the same and reduce the one of the plurality of stages of the multi-stage HVAC system during the post-run sequence.

12. A method for controlling staging of a multi-stage heating, ventilating, and air conditioning (HVAC) system operable in a plurality of stages, comprising:
storing, in a memory of a thermostat, operating conditions for previously run conditioning events of the multi-stage HVAC system;
receiving, by the thermostat, first temperature data from a first temperature sensor indicative of a current indoor ambient temperature inside a building;
receiving, by the thermostat, second temperature data from a second temperature sensor indicative of a current outdoor ambient temperature outside of the building;
receiving, by a user interface of the thermostat, a temperature setpoint for a desired indoor ambient temperature of the building;
determining, by the thermostat, a severity of a call for conditioning for a current conditioning event based on at least one of the current indoor ambient temperature, the current outdoor ambient temperature, and the temperature setpoint;
operating, by the thermostat, the multi-stage HVAC system in one of the plurality of stages for the current conditioning event based on the severity of the call for conditioning for the current conditioning event and the operating conditions for a respective previously run conditioning event to drive the current indoor ambient temperature towards the temperature setpoint; and
increasing, by the thermostat, the one of the plurality of stages of the multi-stage HVAC system in response to a stage run time exceeding a stage run time threshold.

13. The method of claim 12, wherein the thermostat is a non-communicating thermostat such that the thermostat does not communicate with external systems or components outside of the HVAC system.

14. The method of claim 12, further comprising determining, by the thermostat, the one of the plurality of stages for the current conditioning event to operate the multi-stage HVAC system at based on an exit stage and an effectiveness value of the respective previously run conditioning event, wherein an outdoor ambient temperature for the respective previously run conditioning event is substantially similar to the current outdoor ambient temperature.

15. The method of claim 14, further comprising updating, by the thermostat, the operating conditions for the respective previously run conditioning event with the operating conditions of the current conditioning event in response to the current conditioning event having an improved effectiveness value relative to the effectiveness value of the respective previously run conditioning event to adaptively control the multi-stage HVAC system in subsequent conditioning events.

16. A method for controlling staging of a multi-stage heating, ventilating, and air conditioning (HVAC) system operable in a plurality of stages, comprising:
storing, in a memory of a thermostat, operating conditions for previously run conditioning events of the multi-stage HVAC system;

receiving, by the thermostat, first temperature data from a first temperature sensor indicative of a current indoor ambient temperature inside a building;

receiving, by the thermostat, second temperature data from a second temperature sensor indicative of a current outdoor ambient temperature outside of the building;

receiving, by a user interface of the thermostat, a temperature setpoint for a desired indoor ambient temperature of the building;

determining, by the thermostat, a severity of a call for conditioning for a current conditioning event based on at least one of the current indoor ambient temperature, the current outdoor ambient temperature, and the temperature setpoint;

operating, by the thermostat, the multi-stage HVAC system in one of the plurality of stages for the current conditioning event based on the severity of the call for conditioning for the current conditioning event and the operating conditions for a respective previously run conditioning event to drive the current indoor ambient temperature towards the temperature setpoint; and decreasing, by the thermostat, the one of the plurality of stages of the multi-stage HVAC system in response to the current outdoor ambient temperature exceeding a temperature threshold when the multi-stage HVAC system is operating above a predetermined stage.

17. A method for controlling staging of a multi-stage heating, ventilating, and air conditioning (HVAC) system operable in a plurality of stages, comprising:

storing, in a memory of a thermostat, operating conditions for previously run conditioning events of the multi-stage HVAC system;

receiving, by the thermostat, first temperature data from a first temperature sensor indicative of a current indoor ambient temperature inside a building;

receiving, by the thermostat, second temperature data from a second temperature sensor indicative of a current outdoor ambient temperature outside of the building;

receiving, by a user interface of the thermostat, a temperature setpoint for a desired indoor ambient temperature of the building;

determining, by the thermostat, a severity of a call for conditioning for a current conditioning event based on at least one of the current indoor ambient temperature, the current outdoor ambient temperature, and the temperature setpoint;

operating, by the thermostat, the multi-stage HVAC system in one of the plurality of stages for the current conditioning event based on the severity of the call for conditioning for the current conditioning event and the operating conditions for a respective previously run conditioning event to drive the current indoor ambient temperature towards the temperature setpoint; and operating, by the thermostat, the multi-stage HVAC system according to a post-run sequence for a period of time in response to at least one of the call for conditioning being satisfied, a run time of the current conditioning event exceeding a previous run time of the respective previously run conditioning event, and the run time of the current conditioning event exceeding a current run time threshold, wherein the thermostat is configured to at least one of keep the one of the plurality of stages of the multi-stage HVAC system the same and reduce the one of the plurality of stages of the multi-stage HVAC system during the post-run sequence.

* * * * *